United States Patent
Pietrucha et al.

(10) Patent No.: US 10,626,571 B2
(45) Date of Patent: Apr. 21, 2020

(54) GEOTECHNICAL PROFILES AND A METHOD OF MANUFACTURE OF GEOTECHNICAL PROFILES

(71) Applicant: PPH S. I A. Pietrucha Andrzej Pietrucha, Blaszki (PL)

(72) Inventors: Andrzej Pietrucha, Blaszki (PL); Jerzy Pietrucha, Blaszki (PL); Dariusz Ejchman, Warta (PL); Daniel Kolasiński, Łódź (PL)

(73) Assignee: PPH S. I A. PIETRUCHA ANDRZEJ PIETRUCHA, Blaszki (PL)

( * ) Notice: Subject to any disclaimer, the term of this patent is extended or adjusted under 35 U.S.C. 154(b) by 68 days.

(21) Appl. No.: 15/569,991

(22) PCT Filed: Apr. 22, 2016

(86) PCT No.: PCT/PL2016/050015
§ 371 (c)(1),
(2) Date: Oct. 27, 2017

(87) PCT Pub. No.: WO2016/175671
PCT Pub. Date: Nov. 3, 2016

(65) Prior Publication Data
US 2018/0155890 A1    Jun. 7, 2018

(30) Foreign Application Priority Data
Apr. 27, 2015   (PL) .......................................... 412127

(51) Int. Cl.
*E02D 5/03*   (2006.01)
*B32B 17/04*   (2006.01)
(Continued)

(52) U.S. Cl.
CPC ................ *E02D 5/03* (2013.01); *B32B 17/04* (2013.01); *B32B 27/04* (2013.01); *B32B 27/12* (2013.01);
(Continued)

(58) Field of Classification Search
CPC ............ B29C 70/08; B29C 70/20; E02D 5/03
See application file for complete search history.

(56) References Cited

U.S. PATENT DOCUMENTS 4,475,693 A †  10/1984  Munro
4,492,063 A †   1/1985  Schock
(Continued)

FOREIGN PATENT DOCUMENTS

BE   1004560 A3 * 12/1992 ........... B29C 70/088
CA   2889442 A1   10/2015
(Continued)

OTHER PUBLICATIONS

International Search Report, Application No. PCT/PL2016/050015, dated Aug. 1, 2016, 3 pages.

*Primary Examiner* — Tara Mayo-Pinnock
(74) *Attorney, Agent, or Firm* — Ziegler IP Law Group, LLC

(57) ABSTRACT

A method of manufacture of geotechnical profiles where thermoplastic material including one or more of polyvinyl chloride (PVC), polyethylene terephthalate (PET), polyethylene or polythene (PE), acrylonitrile butadiene styrene (ABS), or polypropylene (PP), is plasticized in an extruder, pressed through a cross die unit and internal reinforcing profiles in the form of flat bars, arched elements, angled elements, ribbed profiles or sections of any geometry are entered at least in selected cross-section areas of the geotechnical profile where the internal reinforcing profiles are created from one or more of continuous or chopped fiber (Continued)

Figure 1:
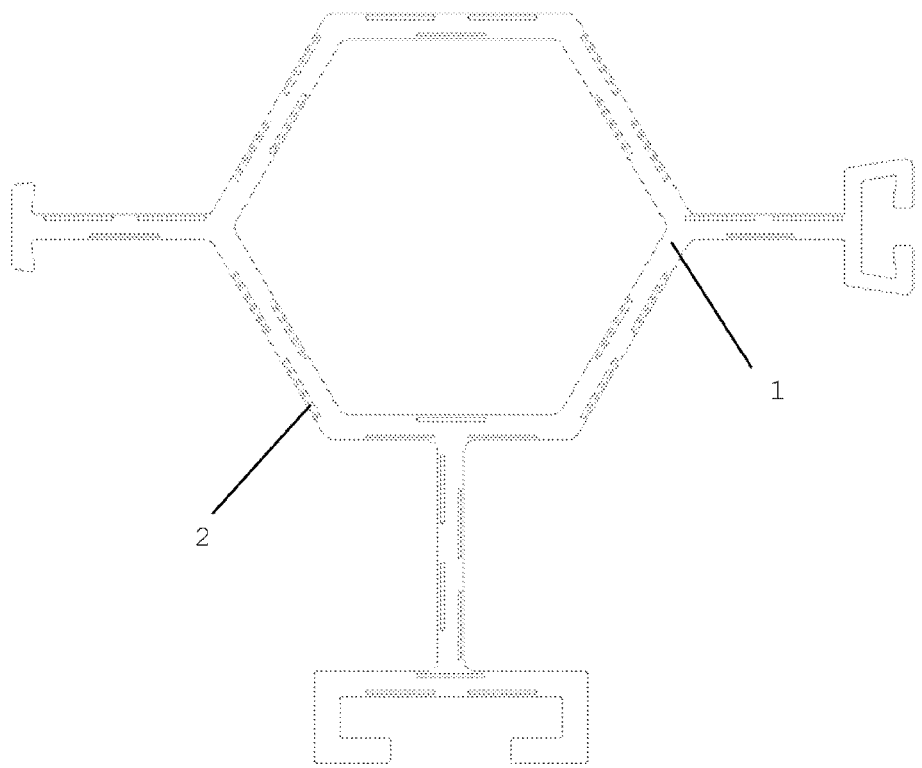
Figure 2:
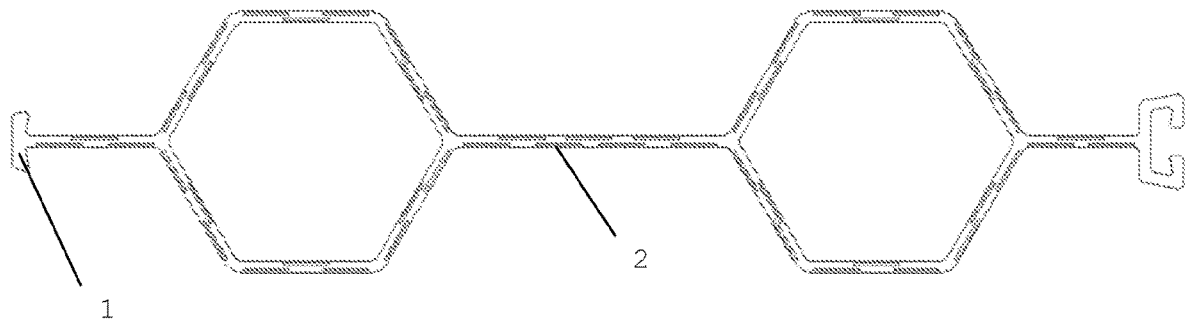
Figure 3:
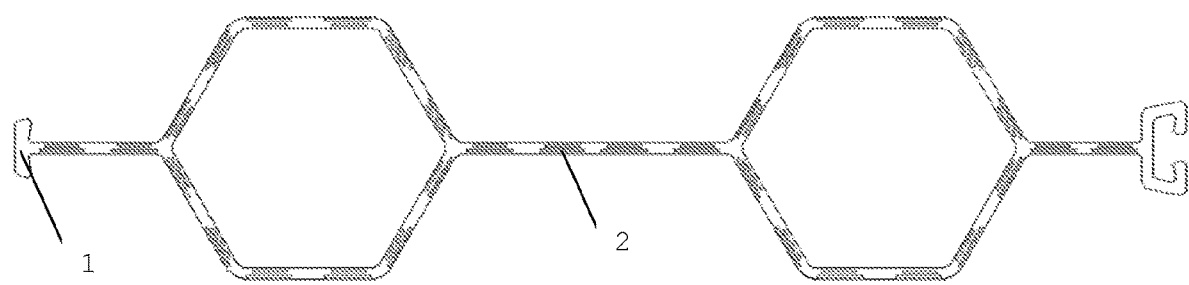
Figure 4:
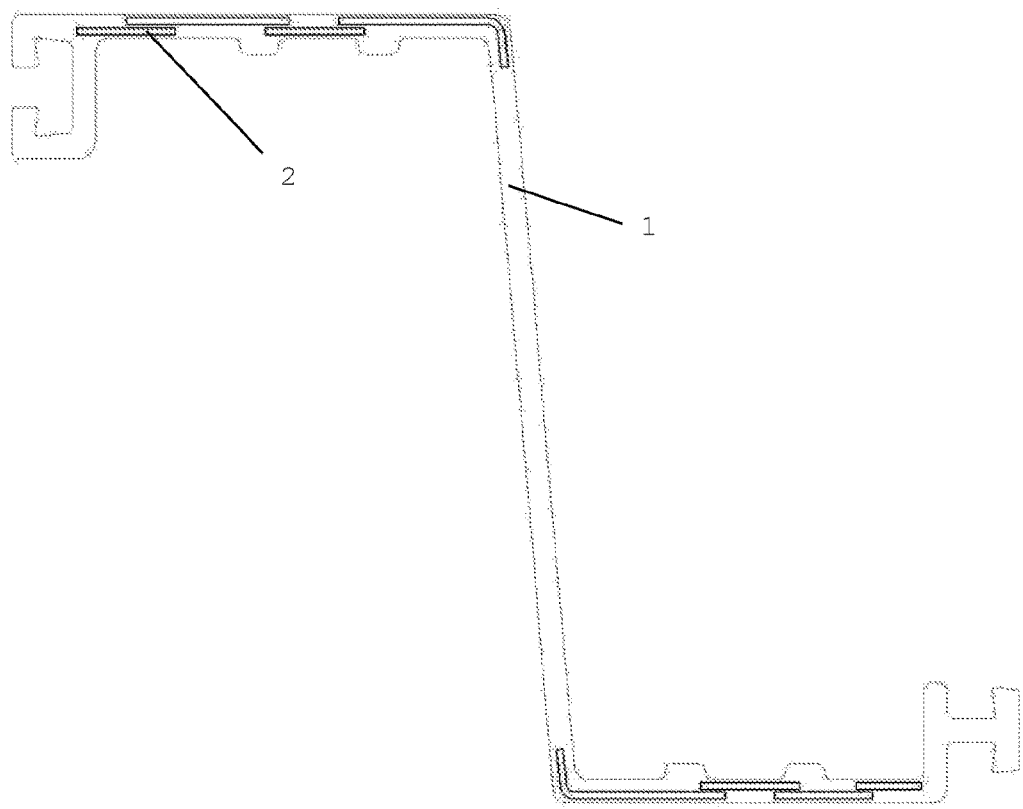
Figure 5:
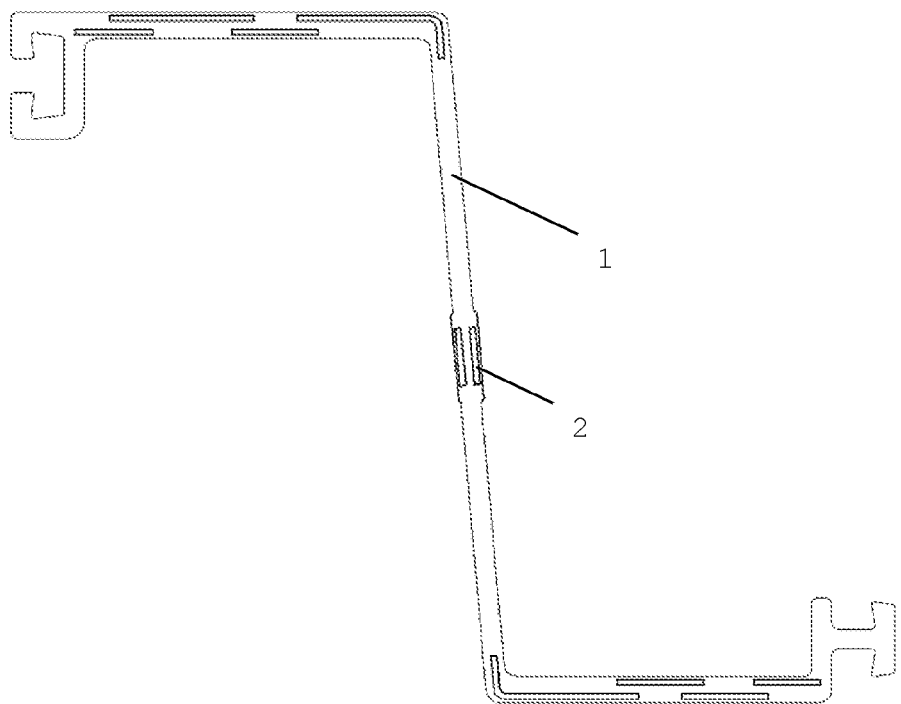
Figure 6:
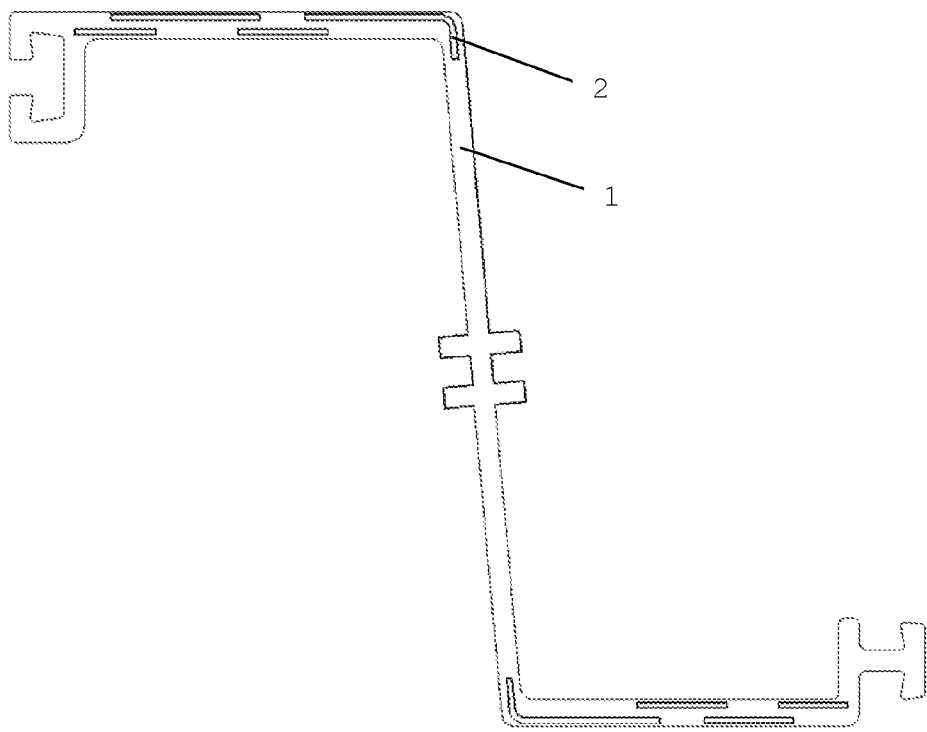
Figure 7:
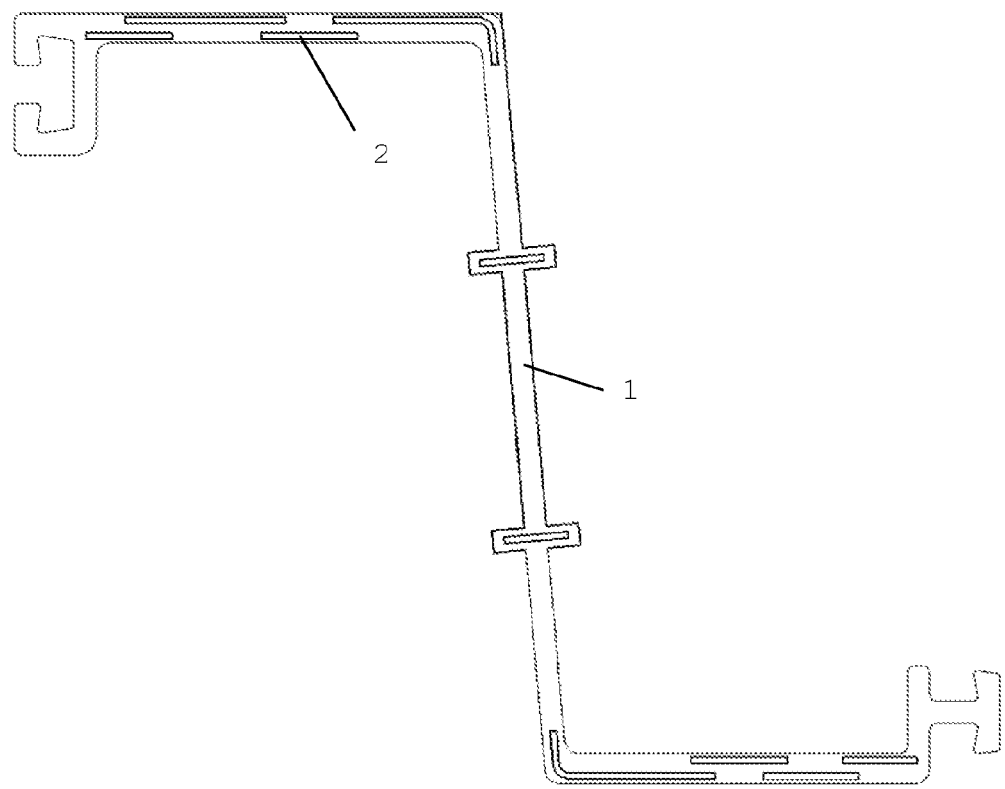
Figure 8:
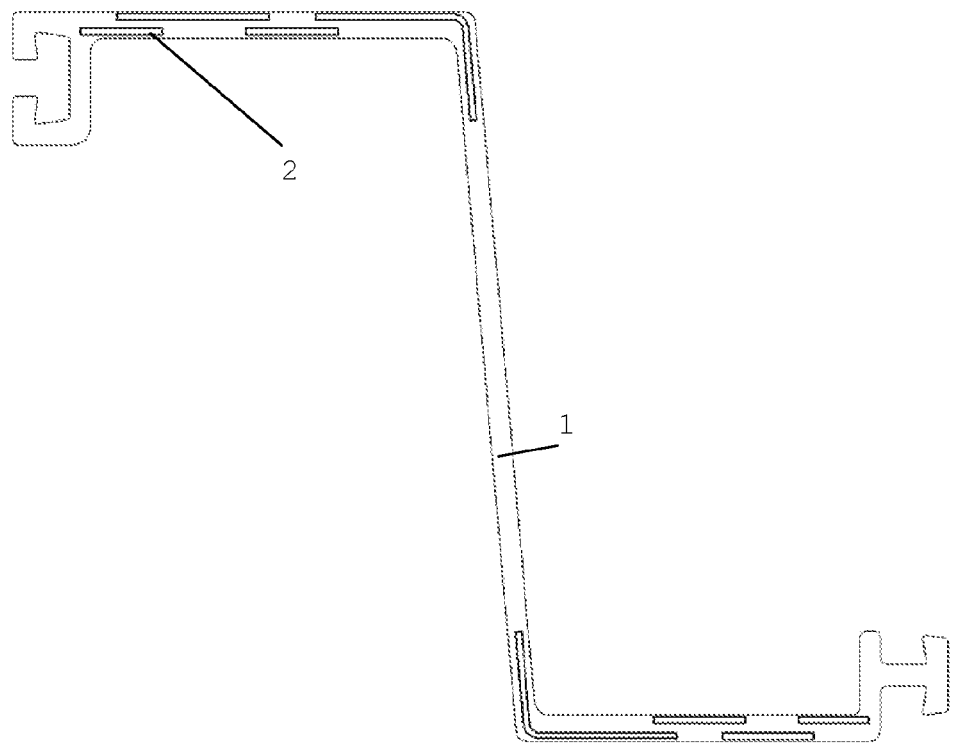
Figure 9:
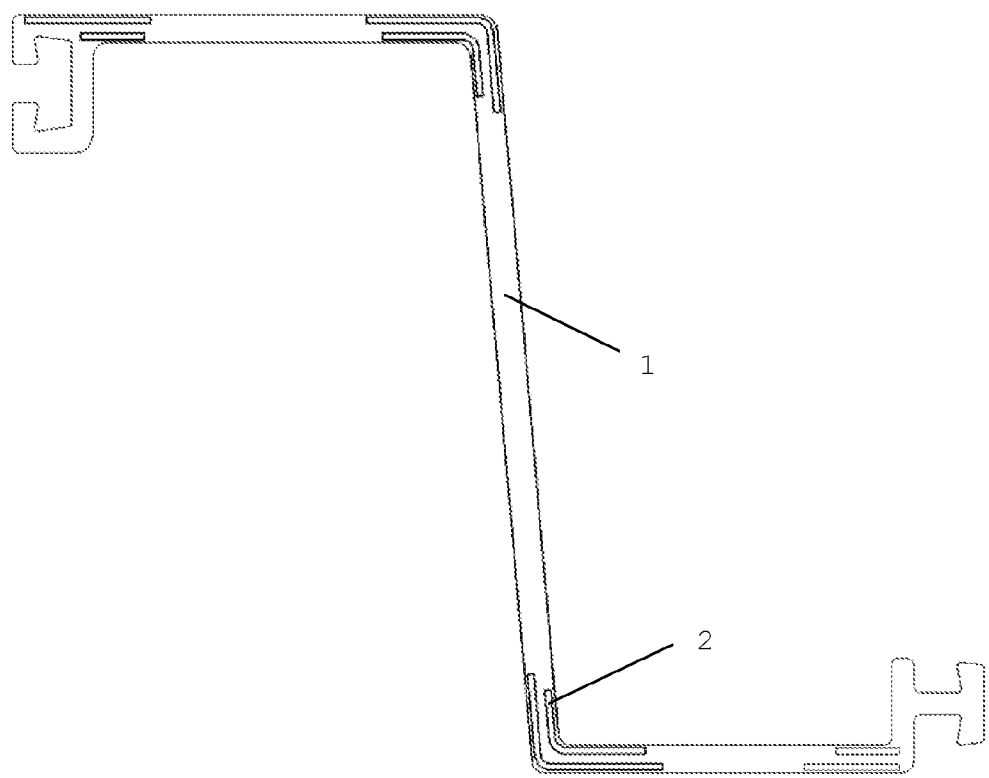
Figure 10:
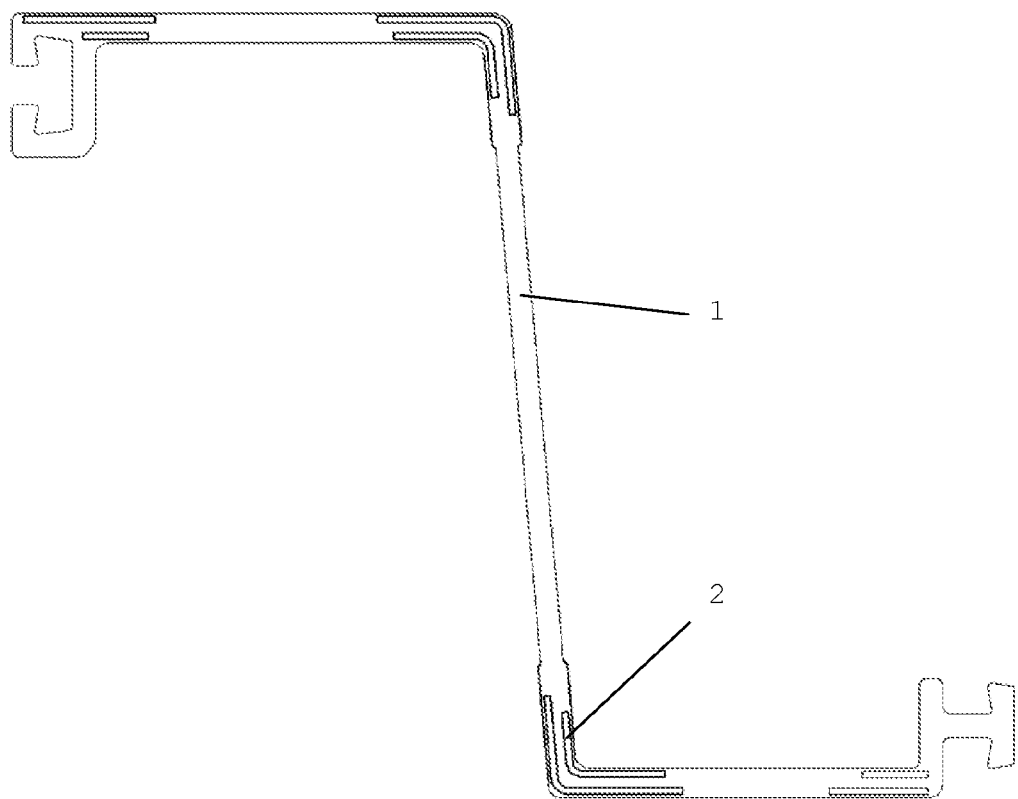
Figure 11:
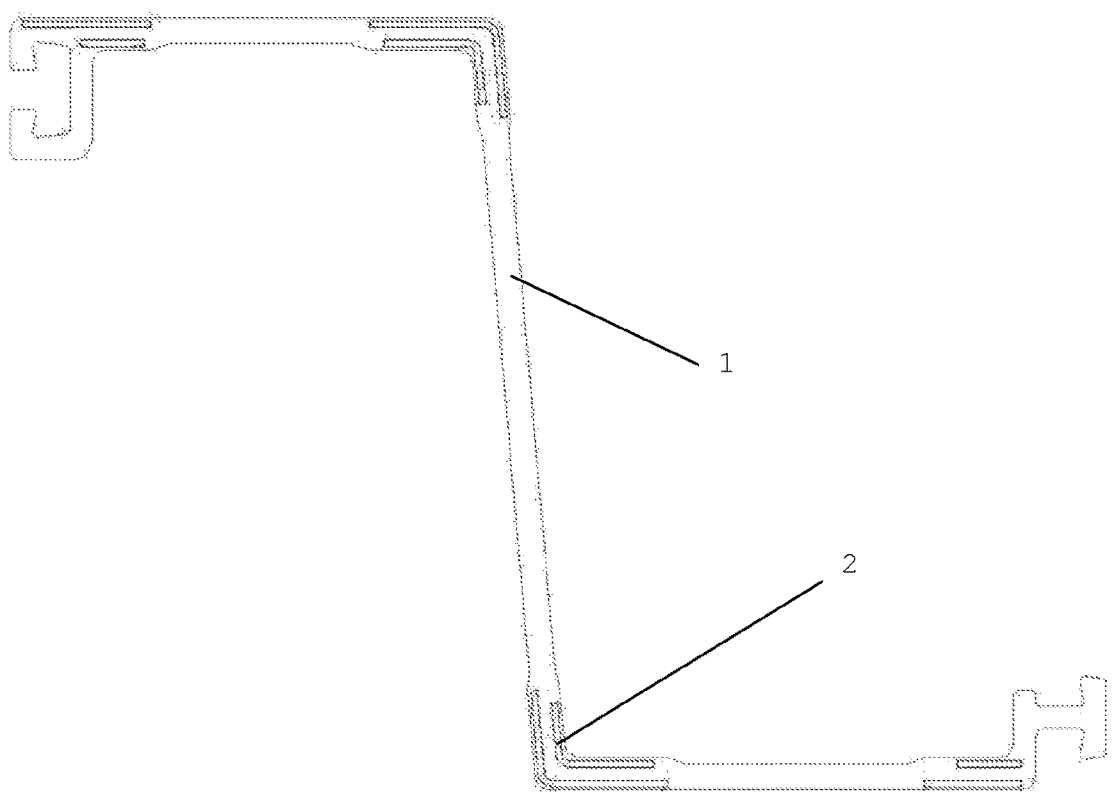
Figure 12:
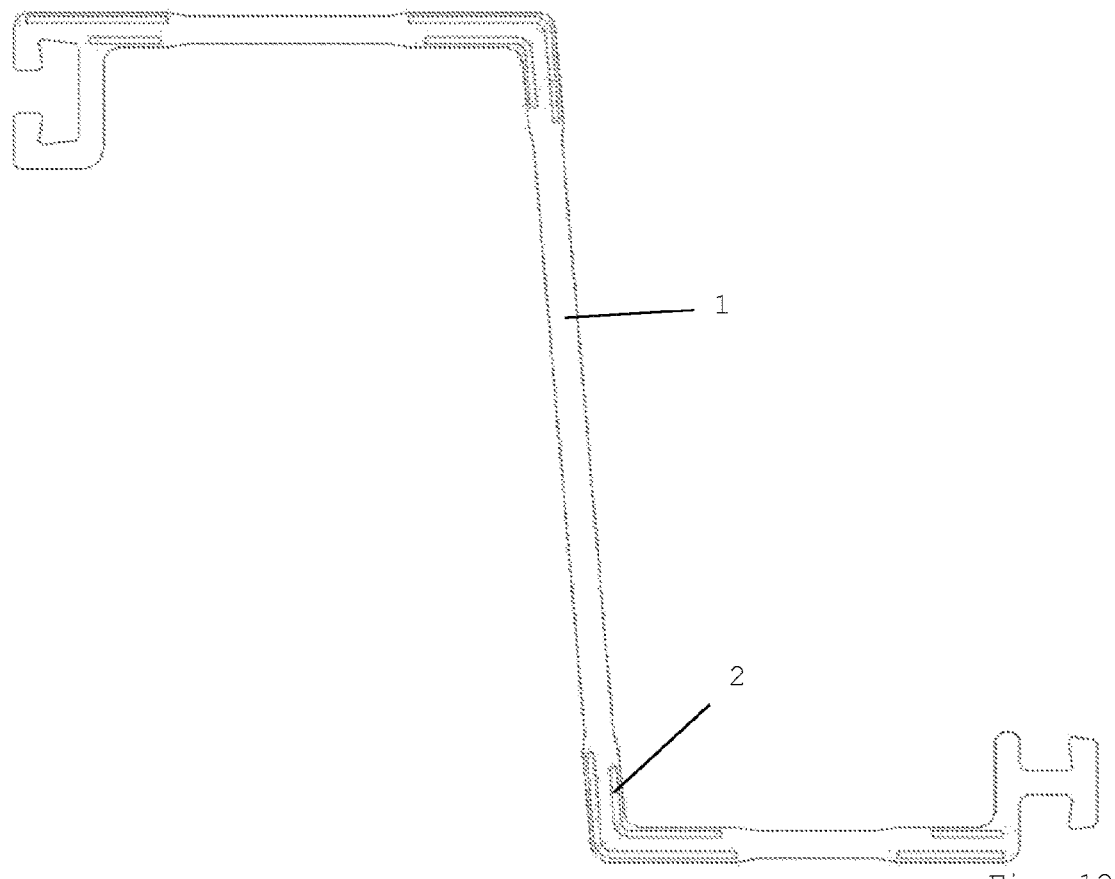
Figure 13:
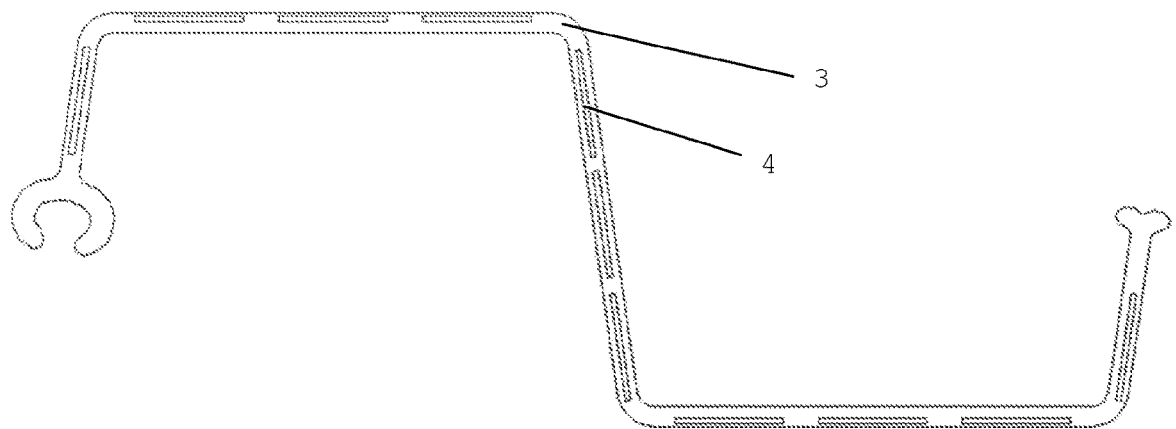
Figure 14:
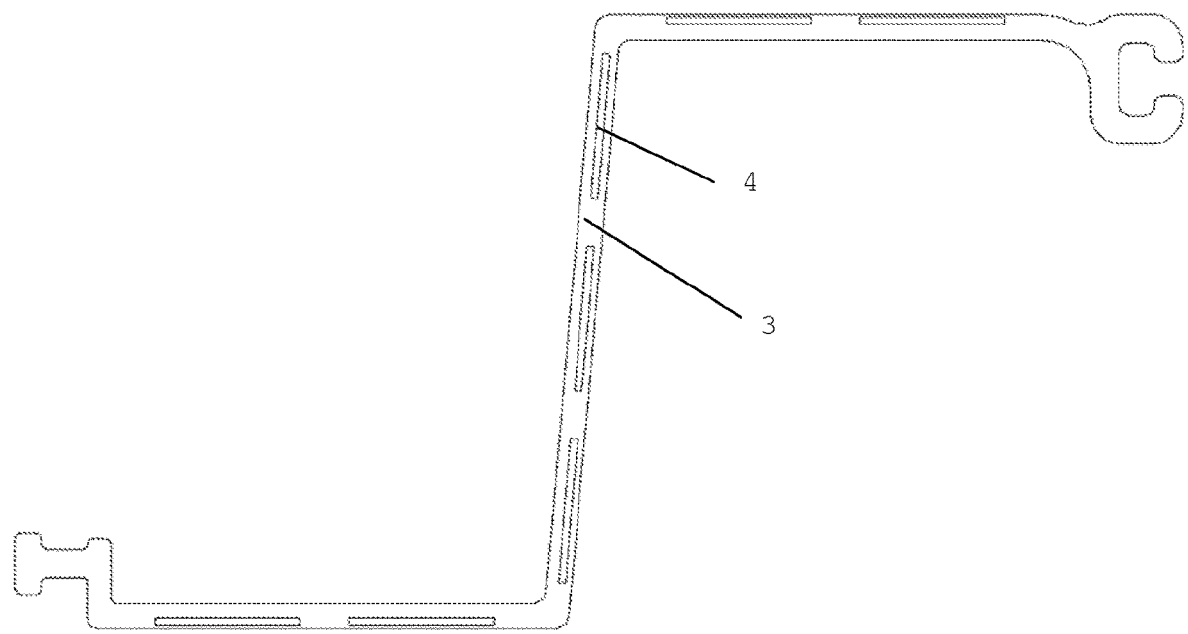
Figure 15:
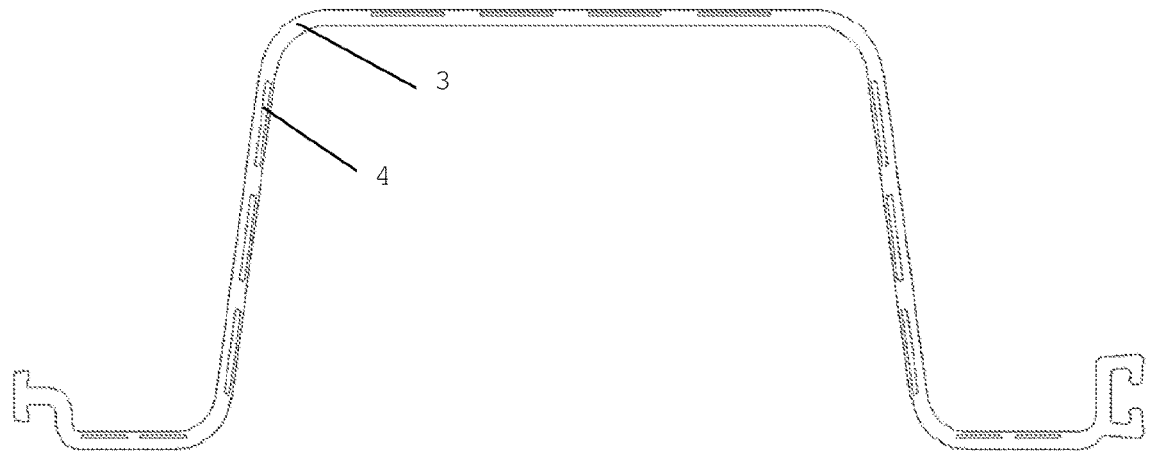
Figure 16:
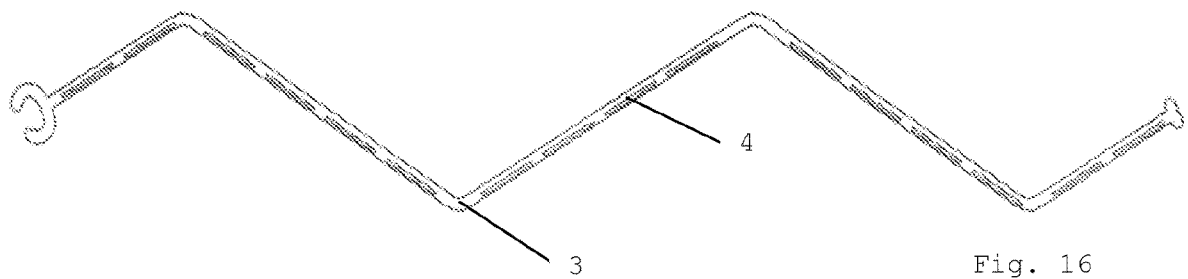
Figure 17:
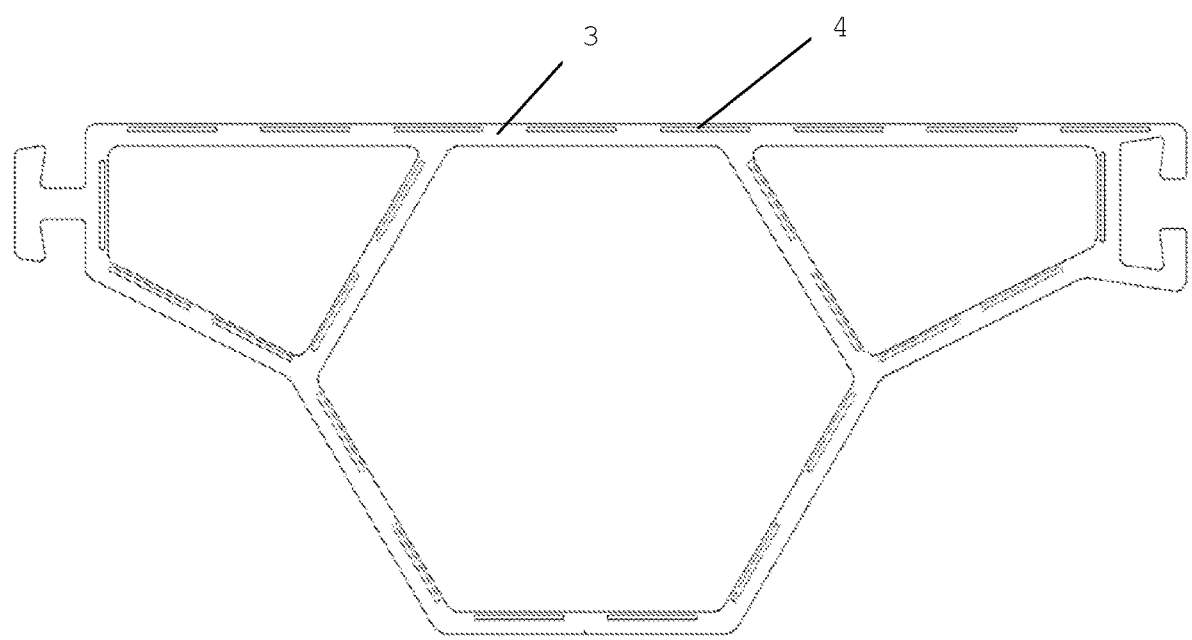
Figure 18:
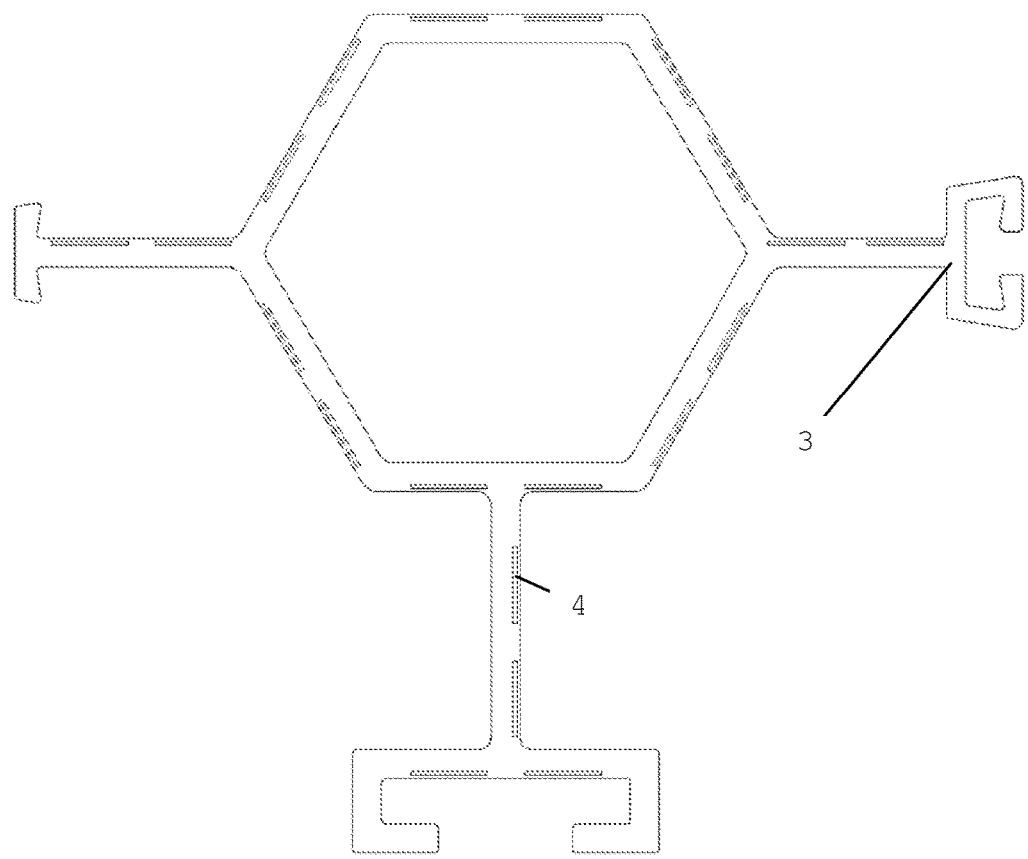
Figure 19:
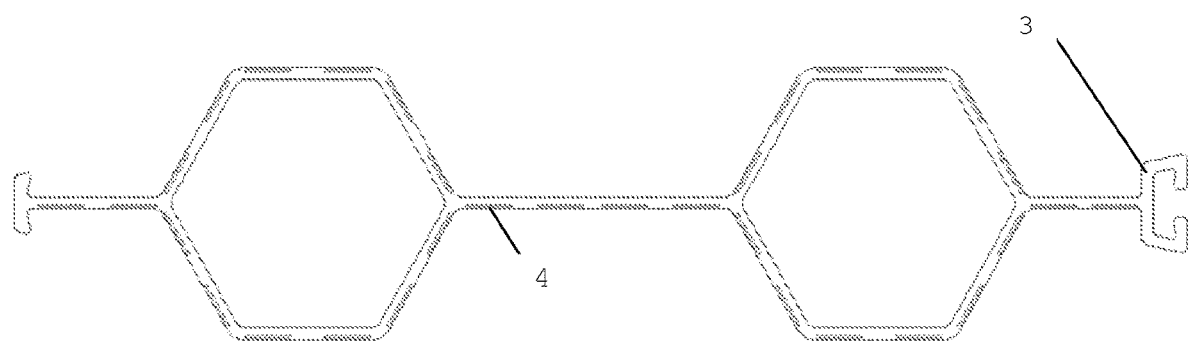
Figure 20:
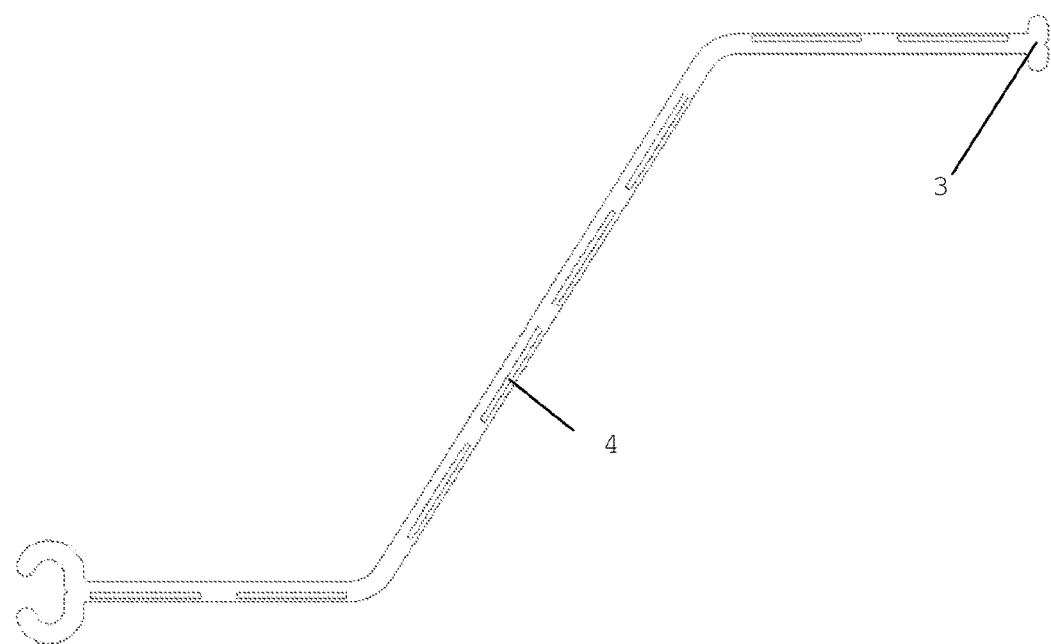
Figure 21:
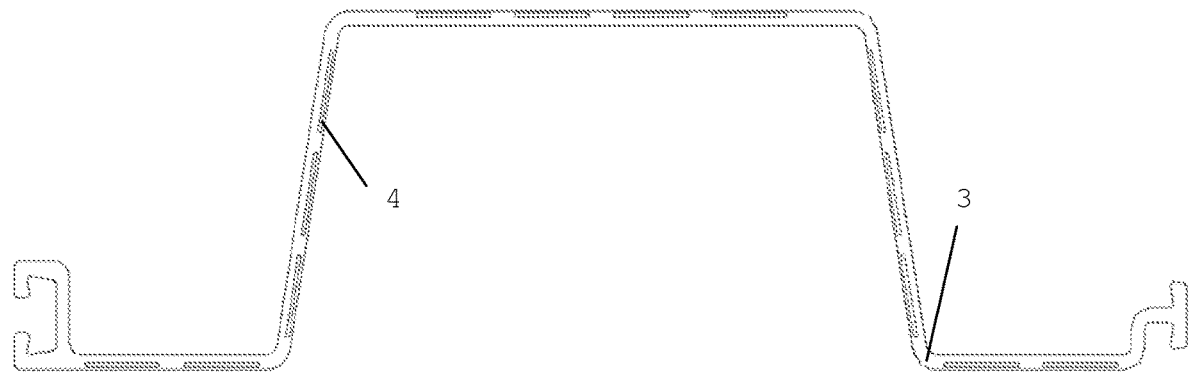
Figure 22:
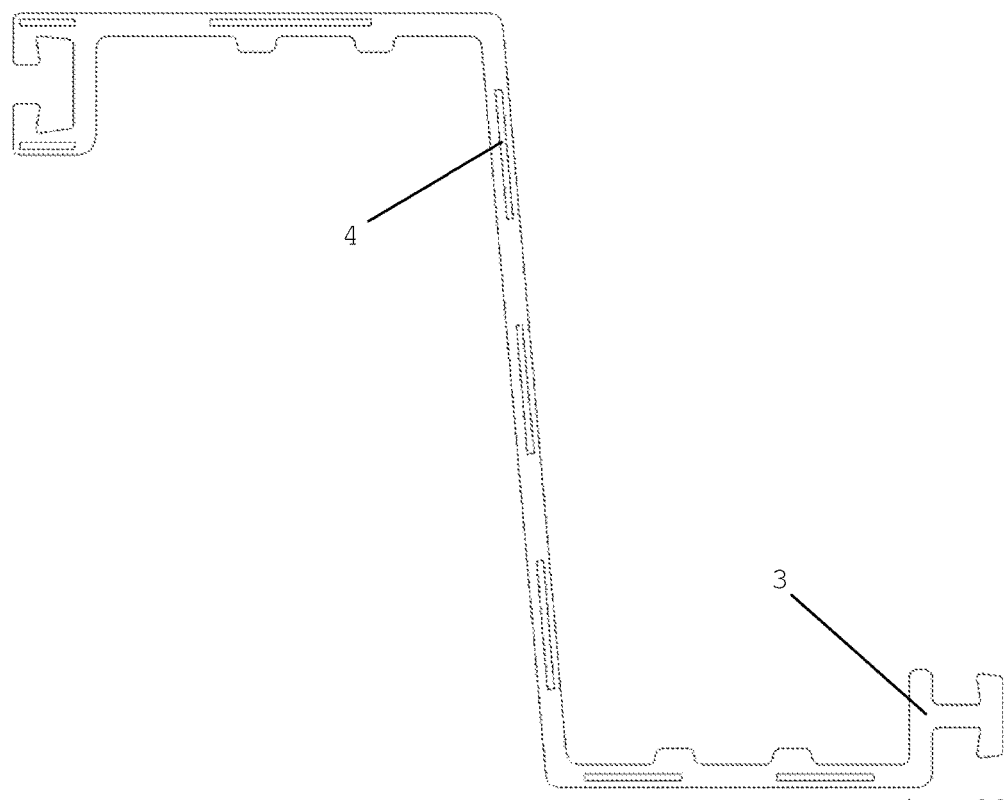
Figure 23:
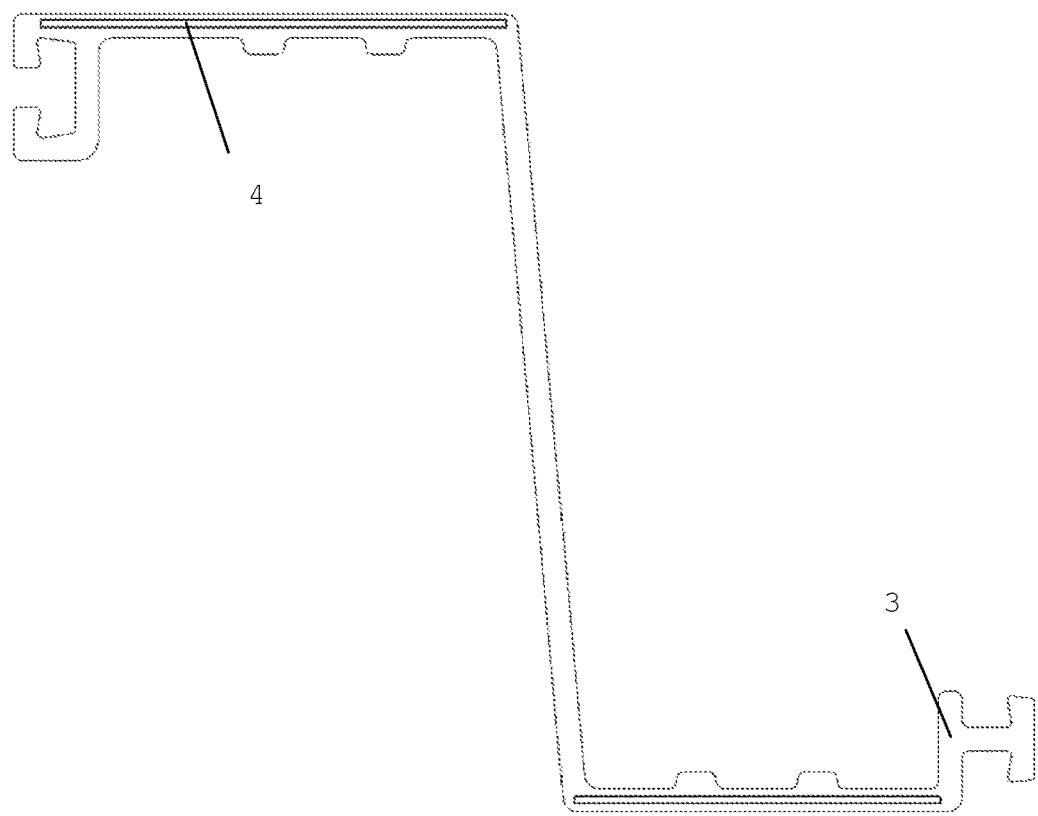
Figure 24:
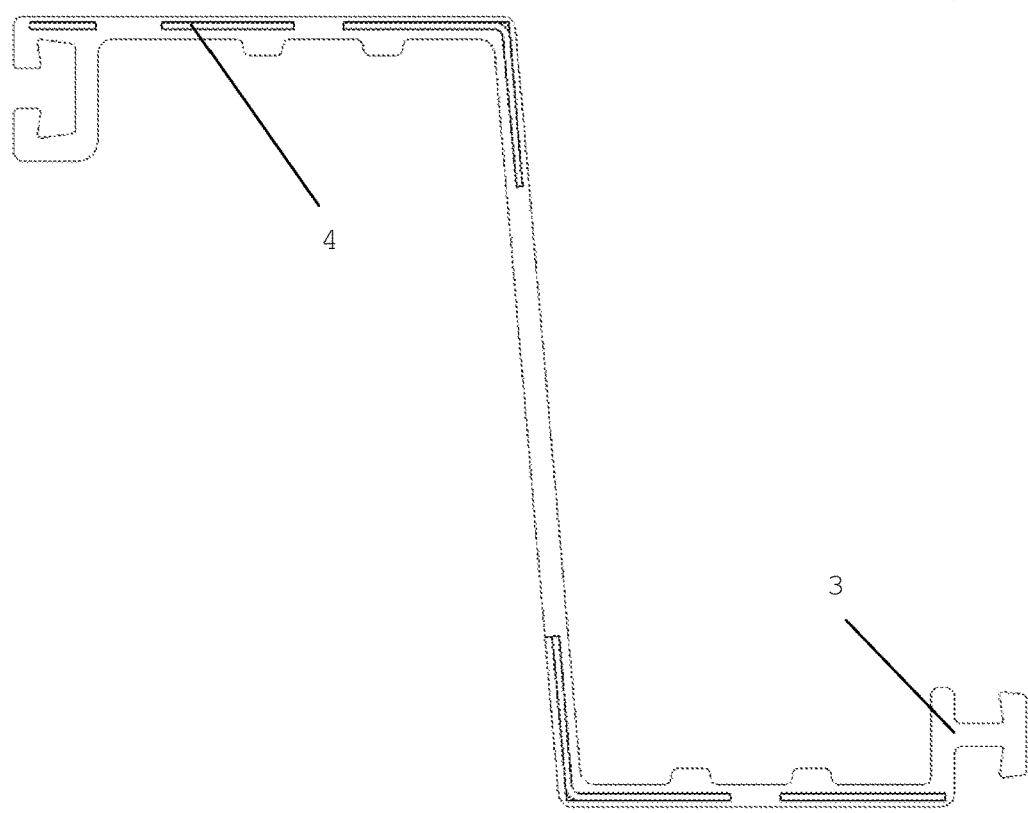
Figure 25:
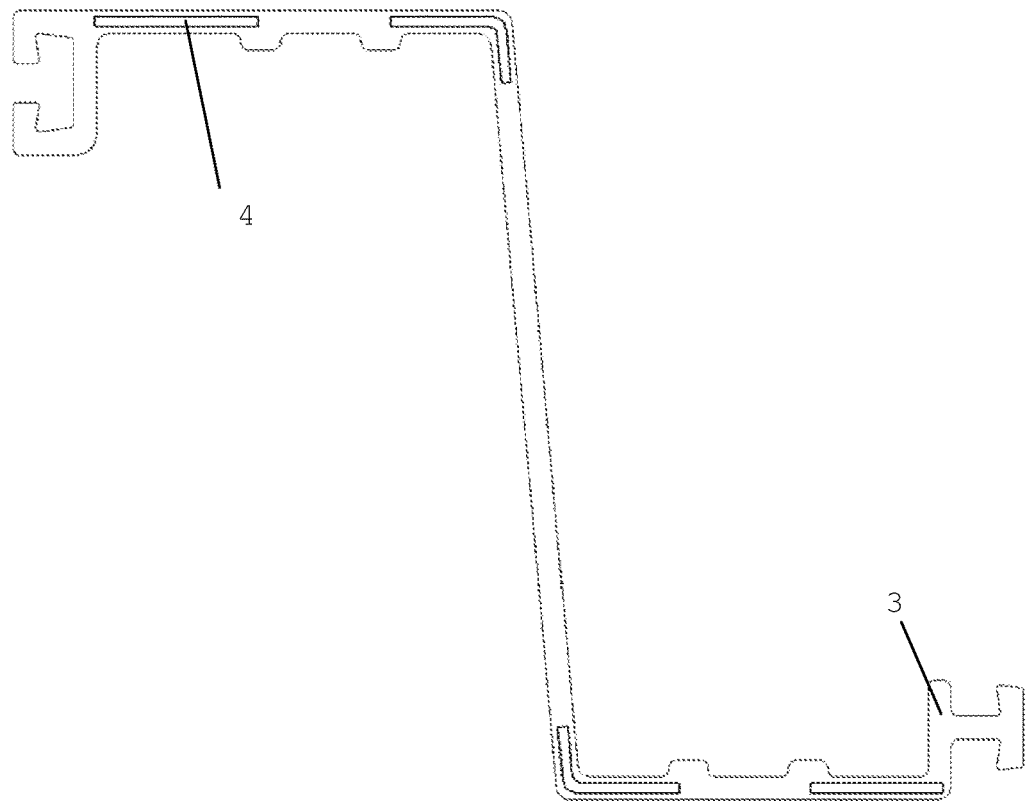
Figure 26:
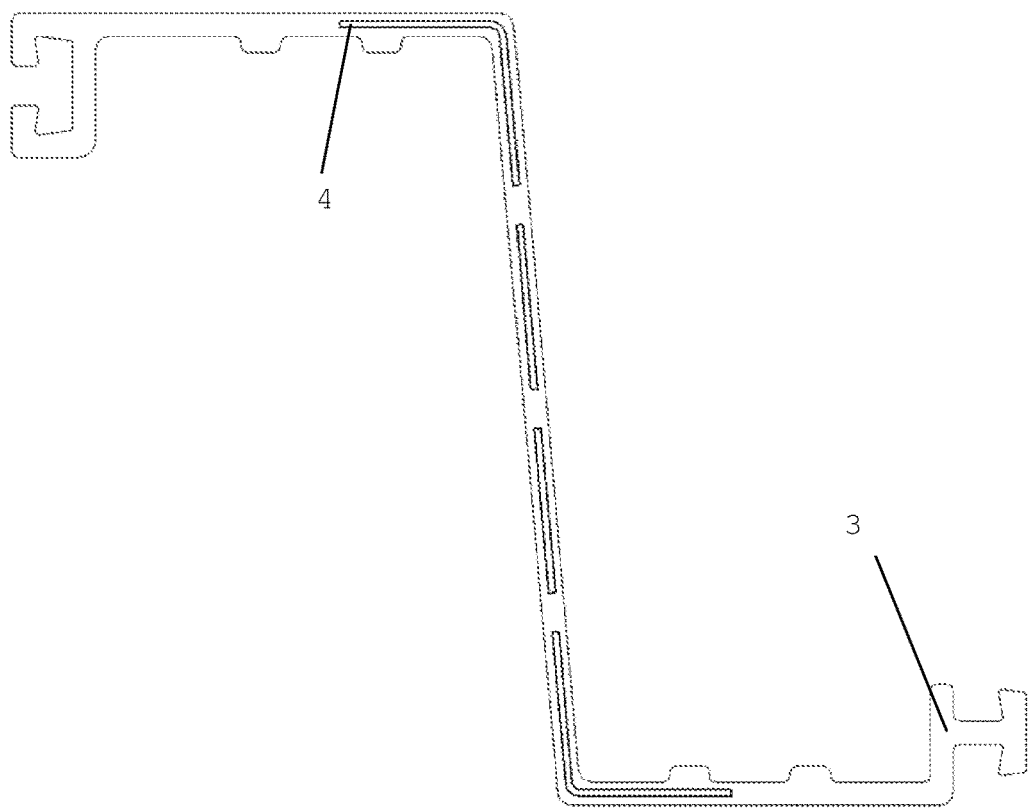
Figure 27:
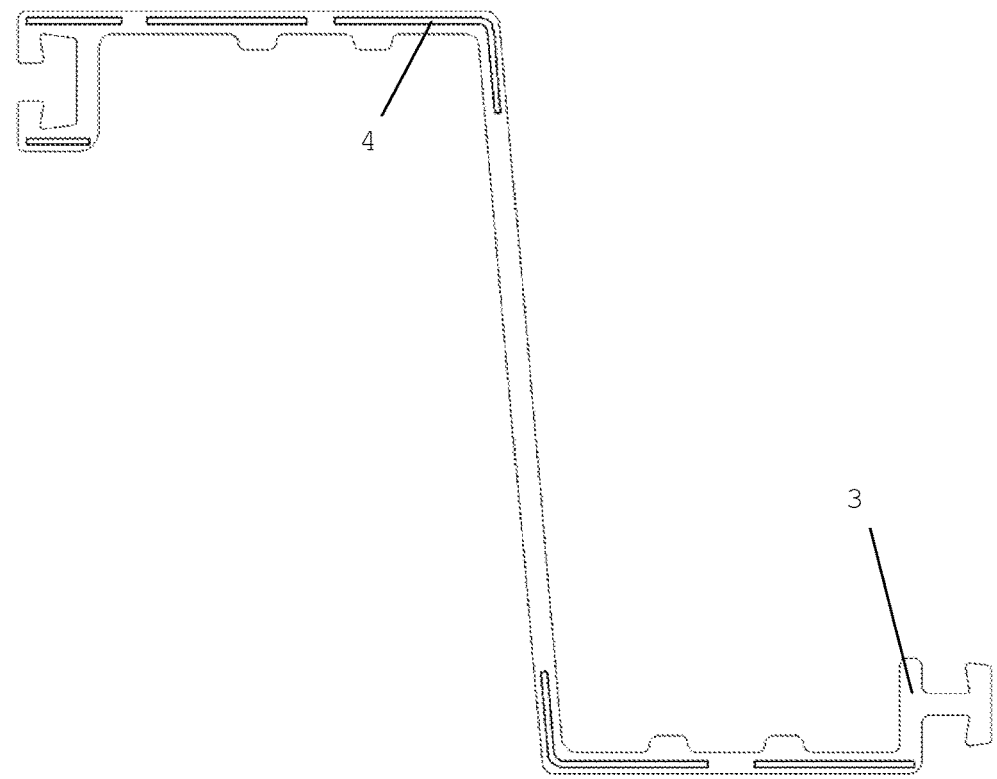
Figure 28:
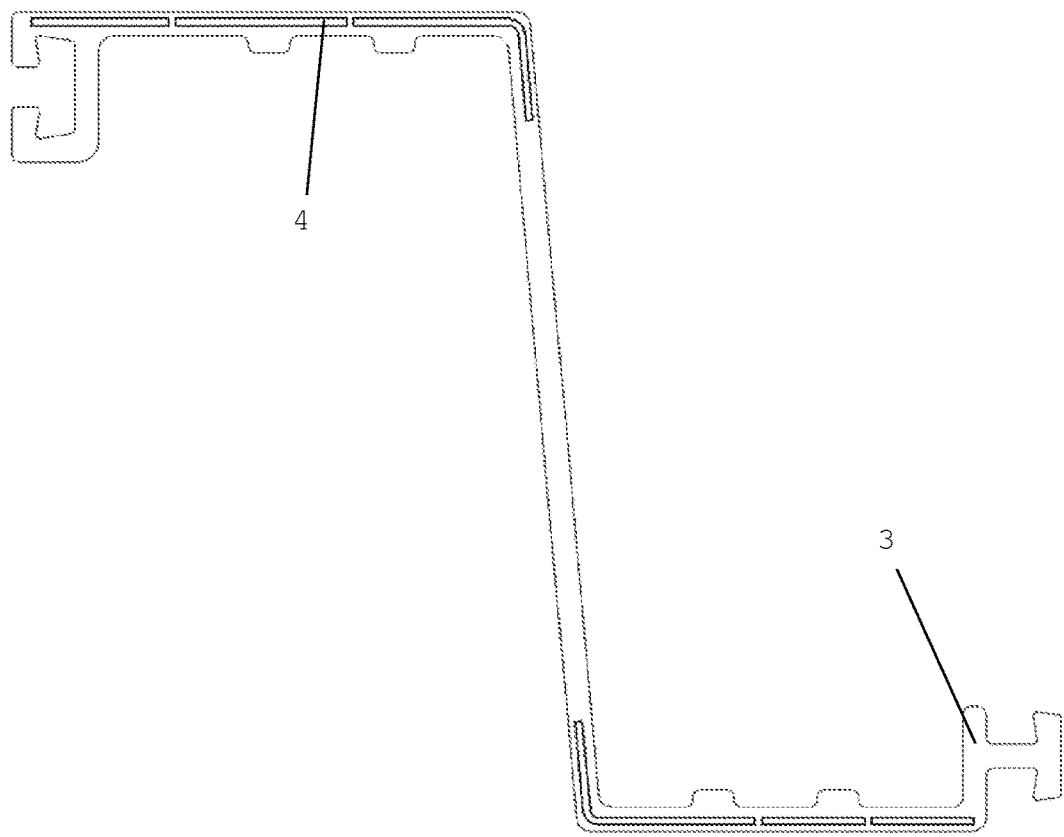
Figure 29:
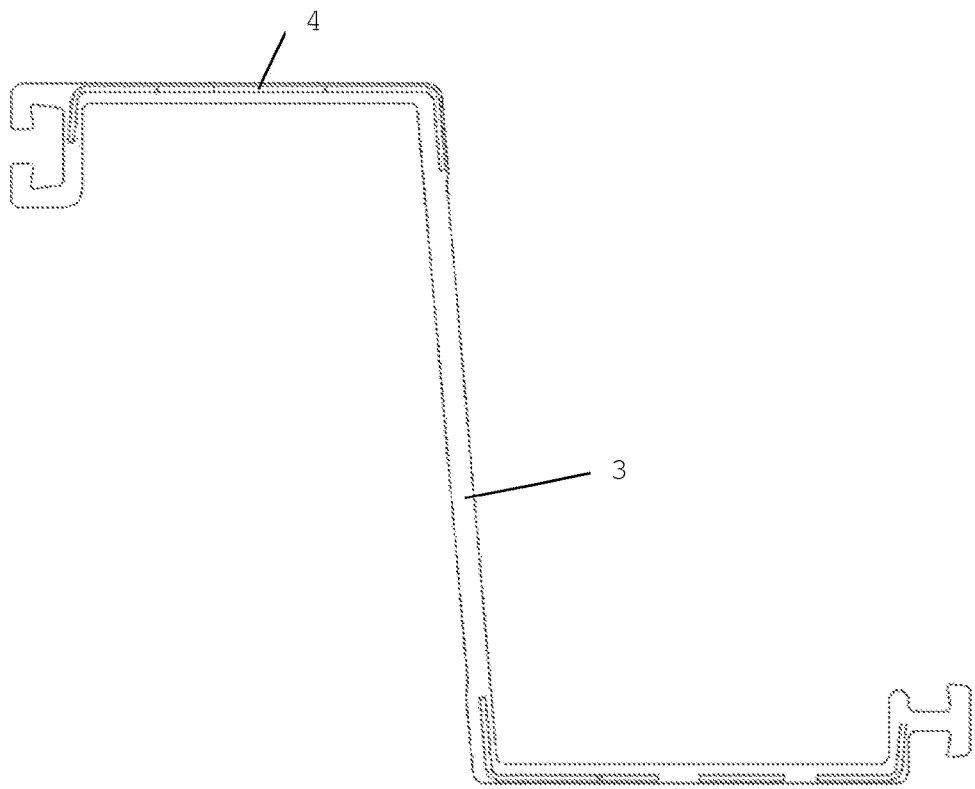
Figure 30:
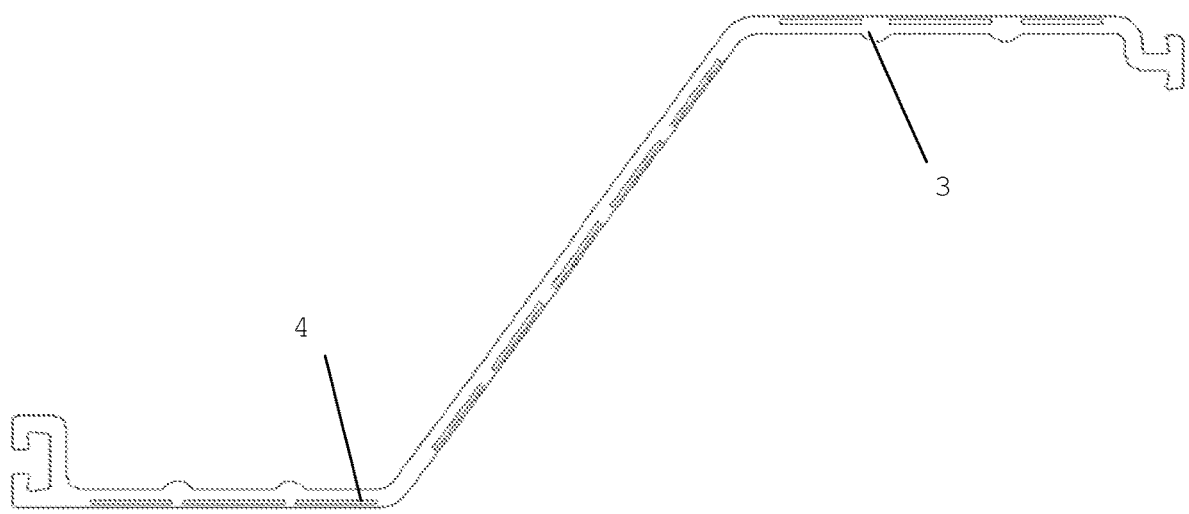
Figure 31:
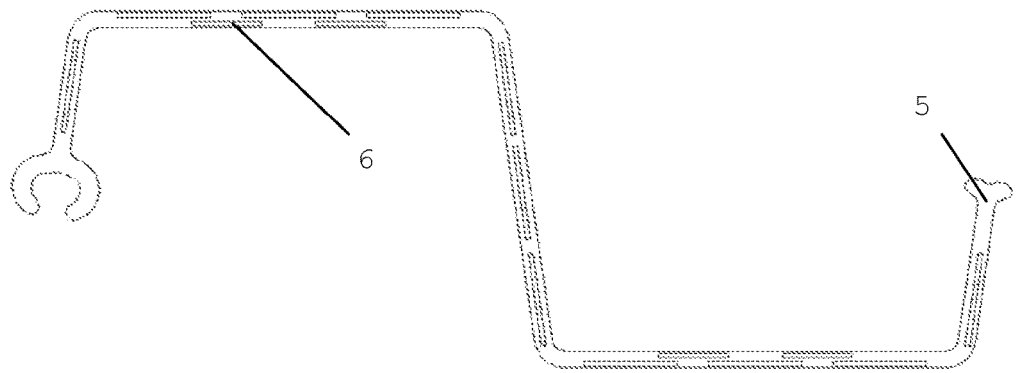
Figure 32:
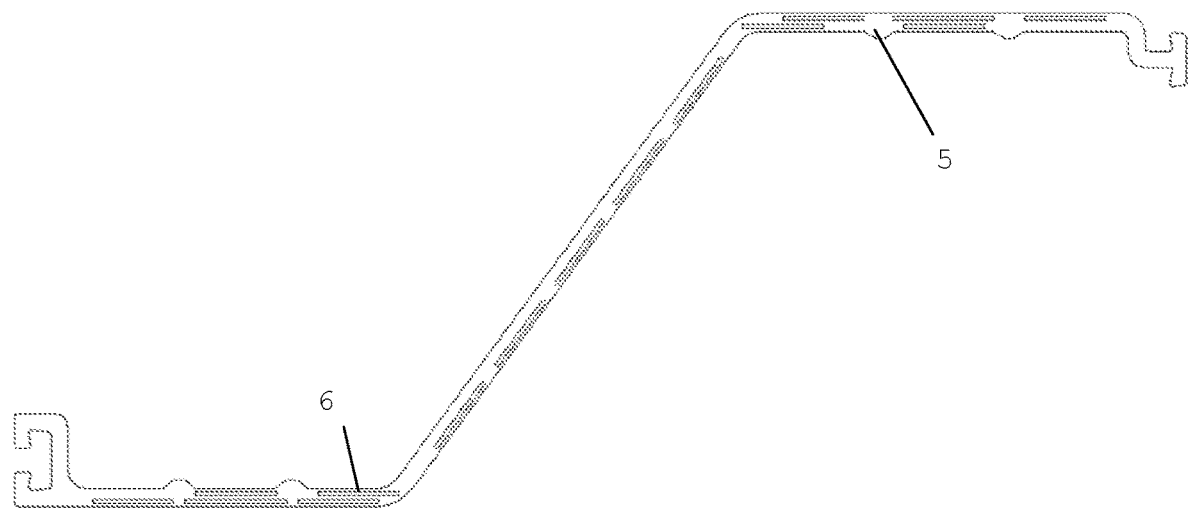
Figure 33:
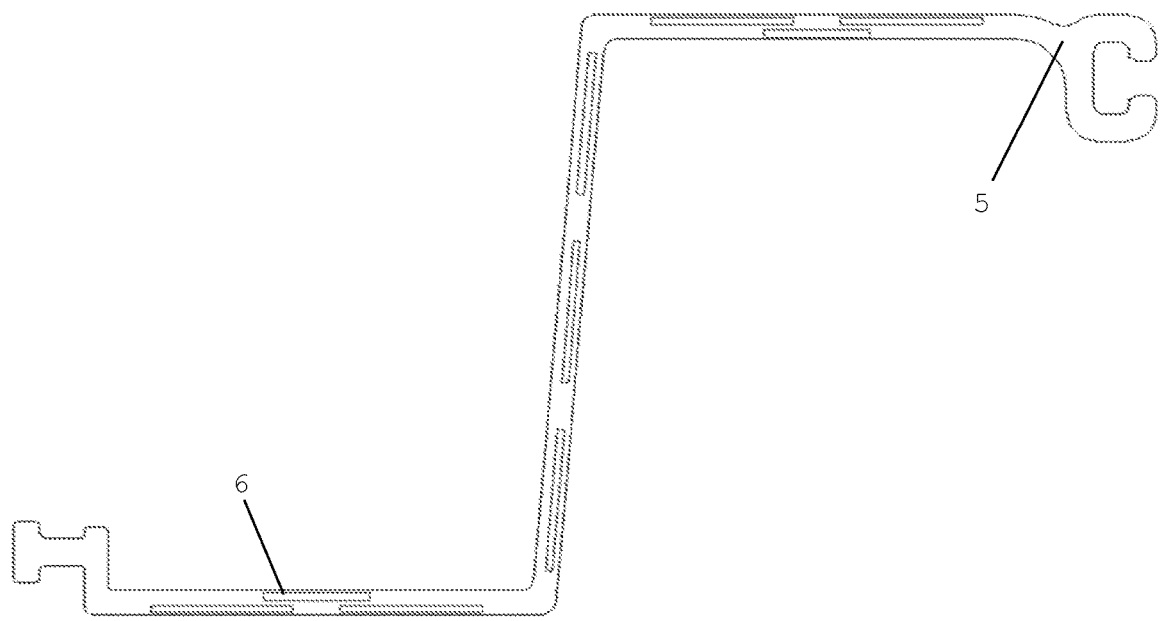
Figure 34:
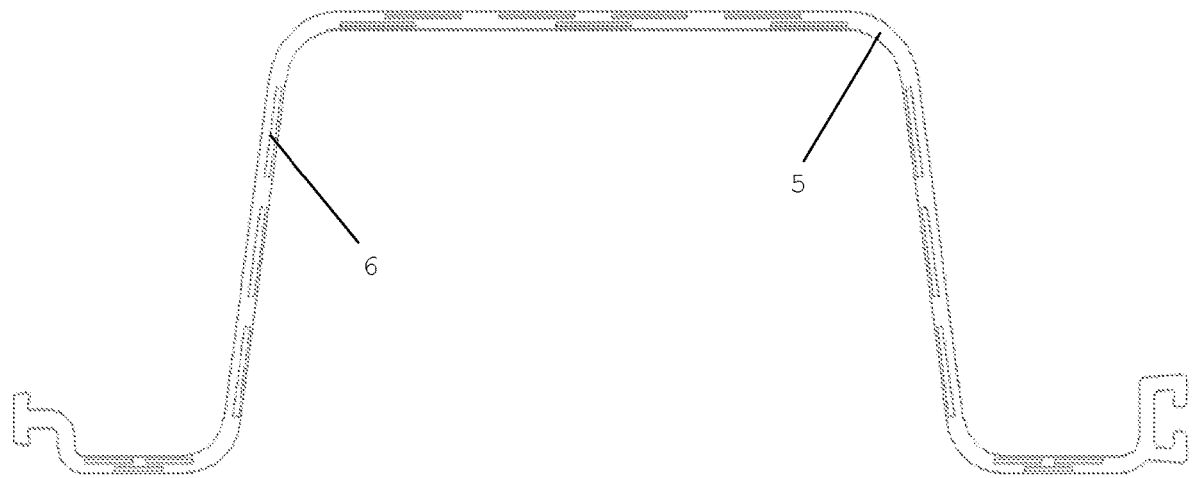
Figure 35:
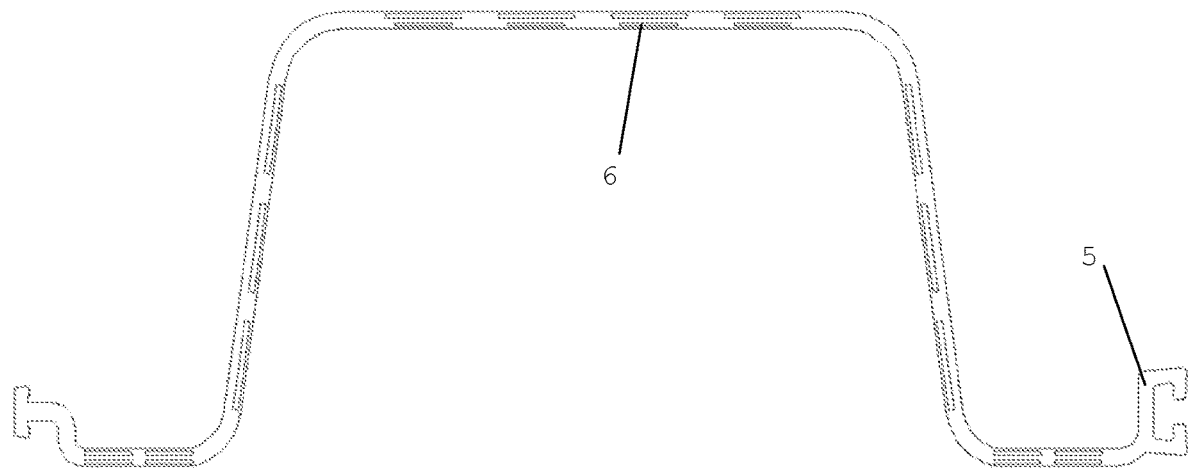
Figure 36:
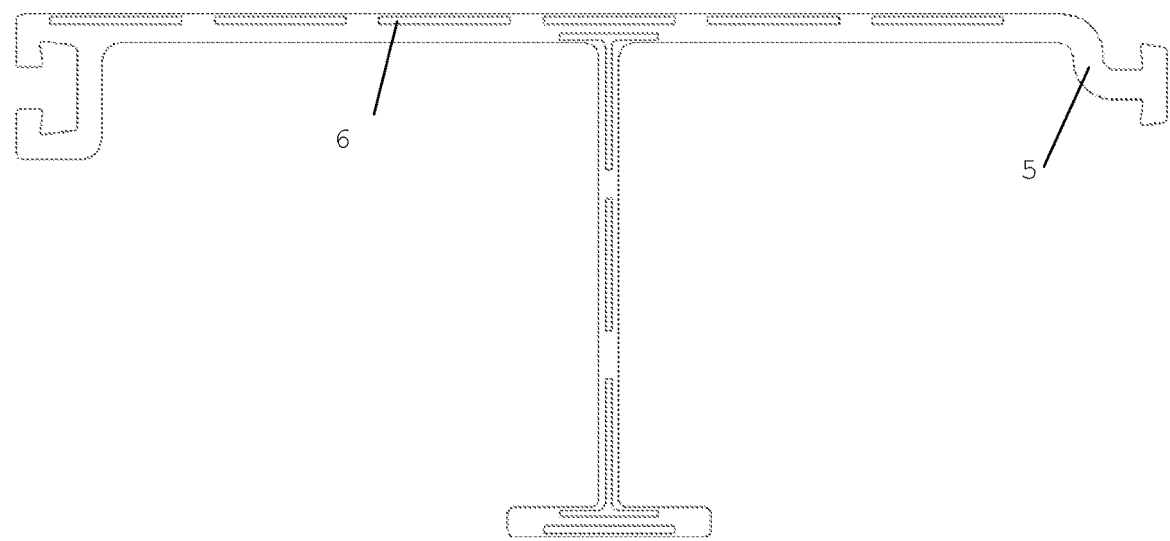
Figure 37:
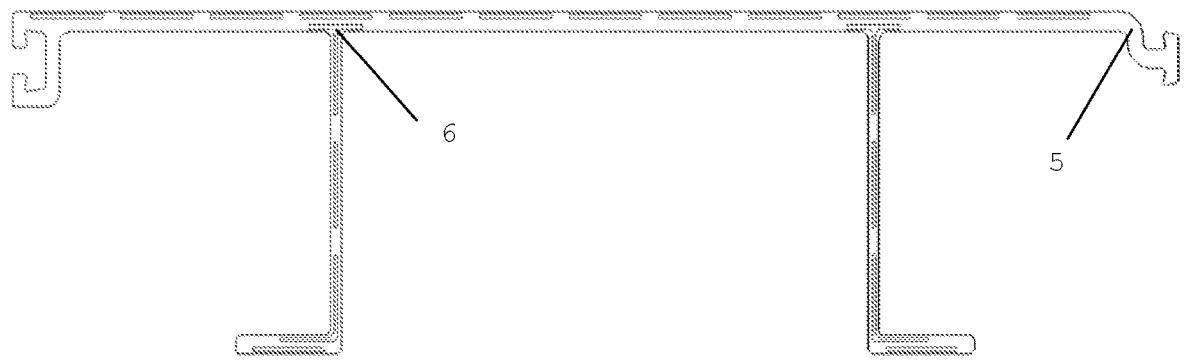
Figure 38:
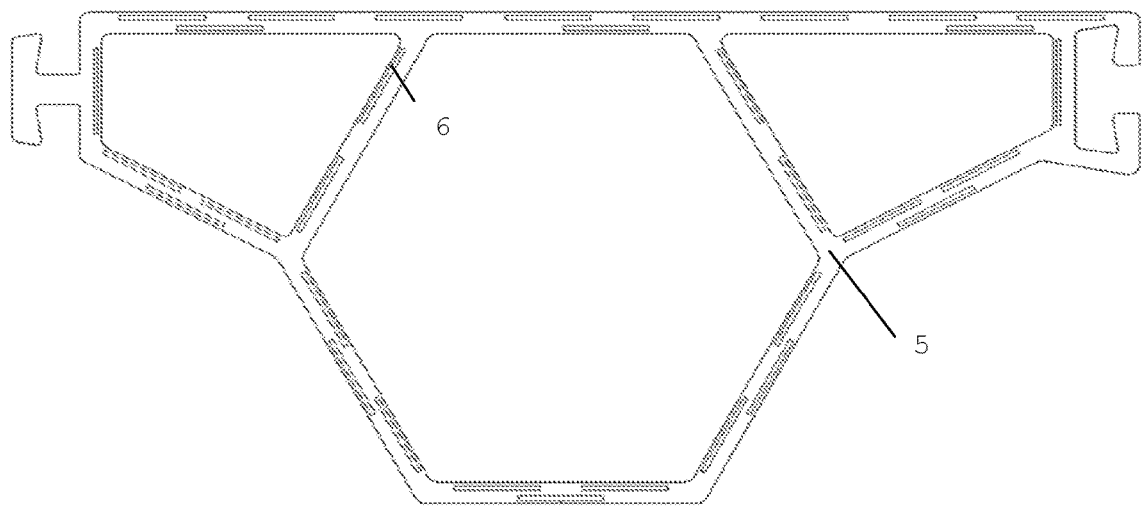
Figure 39:
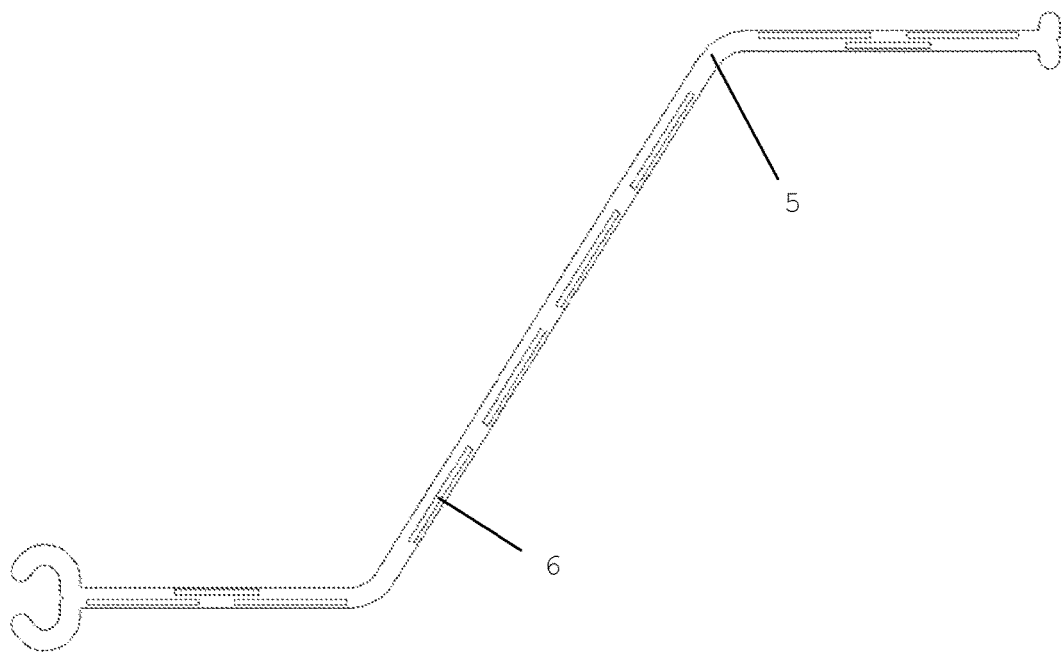
Figure 40:
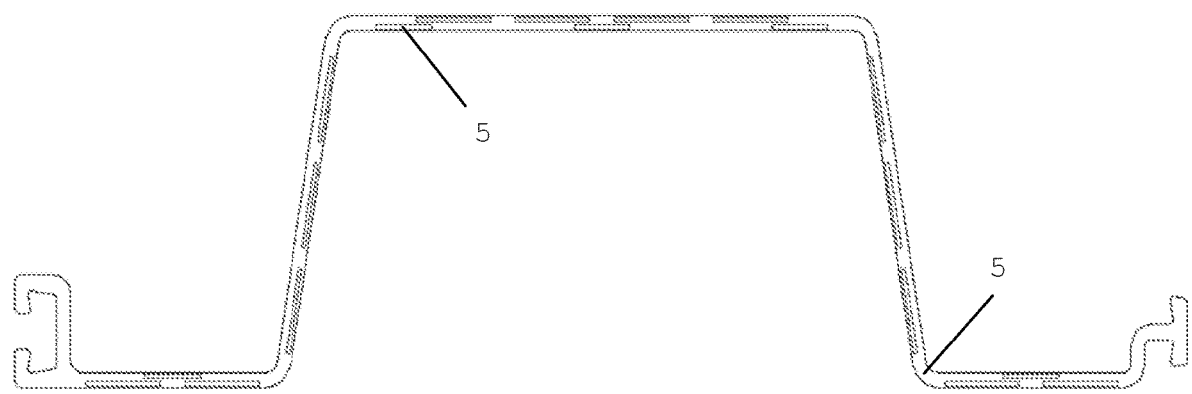
Figure 41:
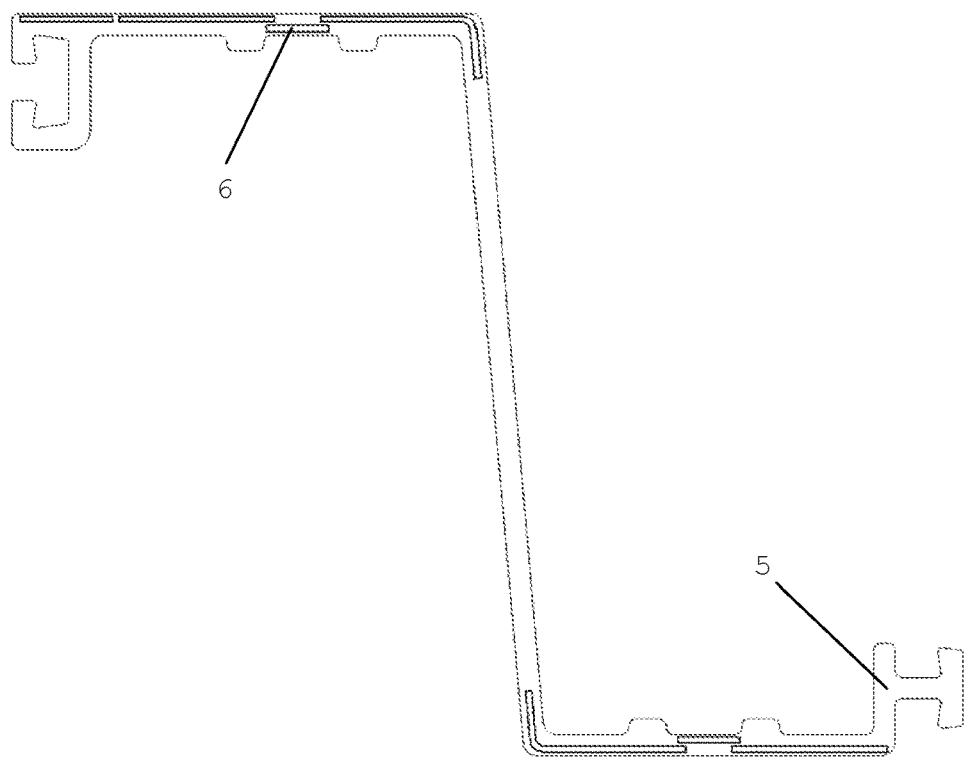
Figure 42:
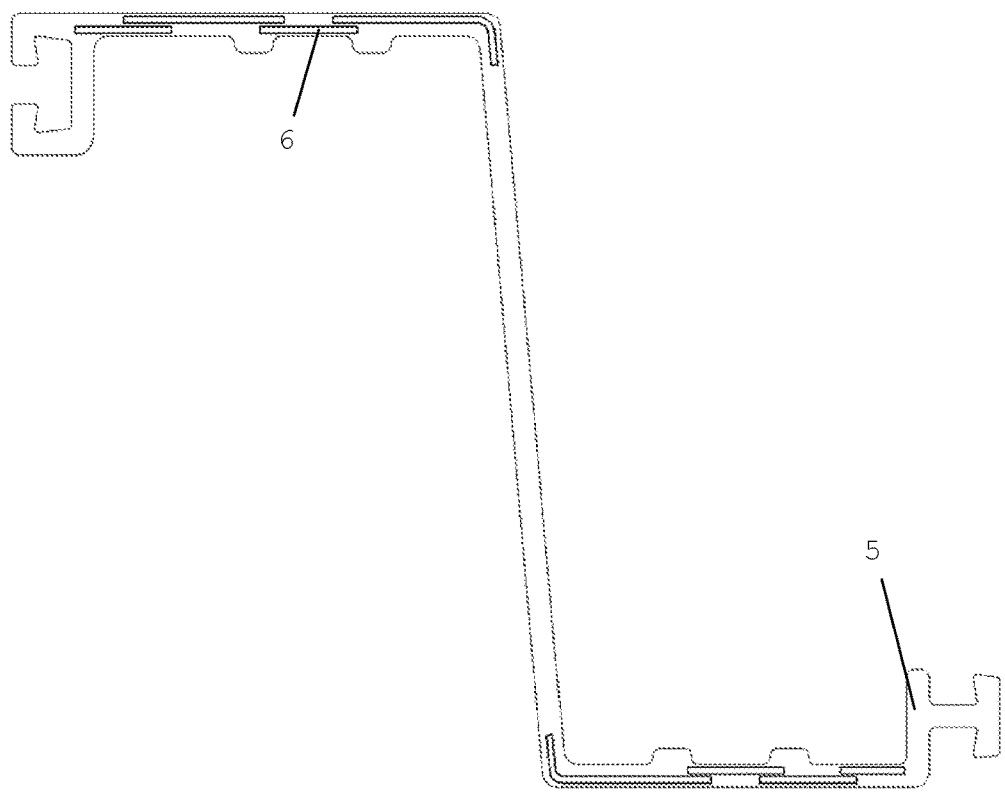
Figure 43:
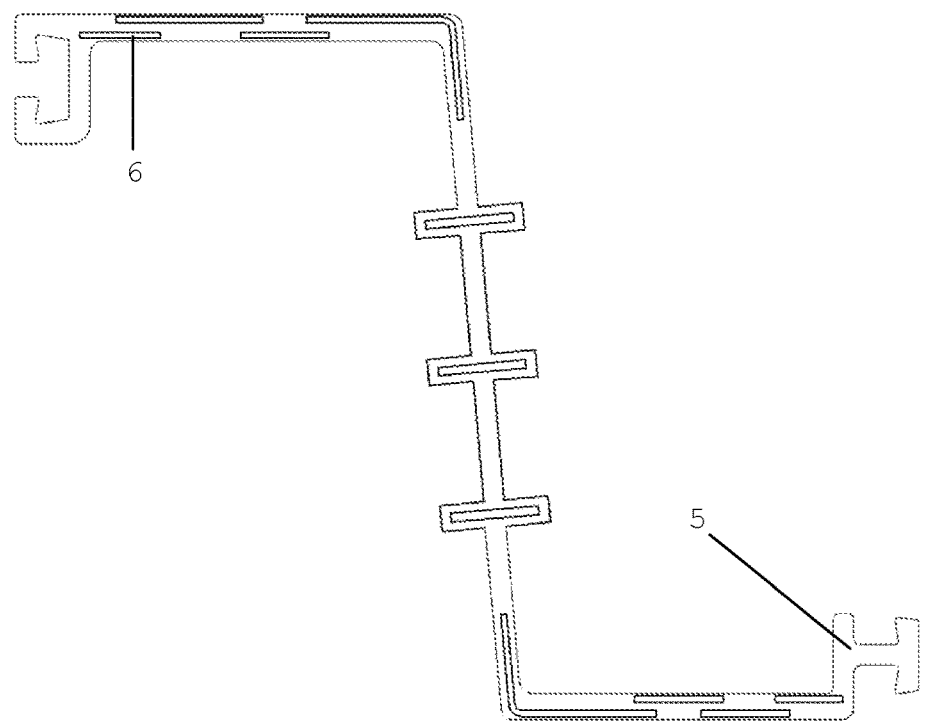
Figure 44:
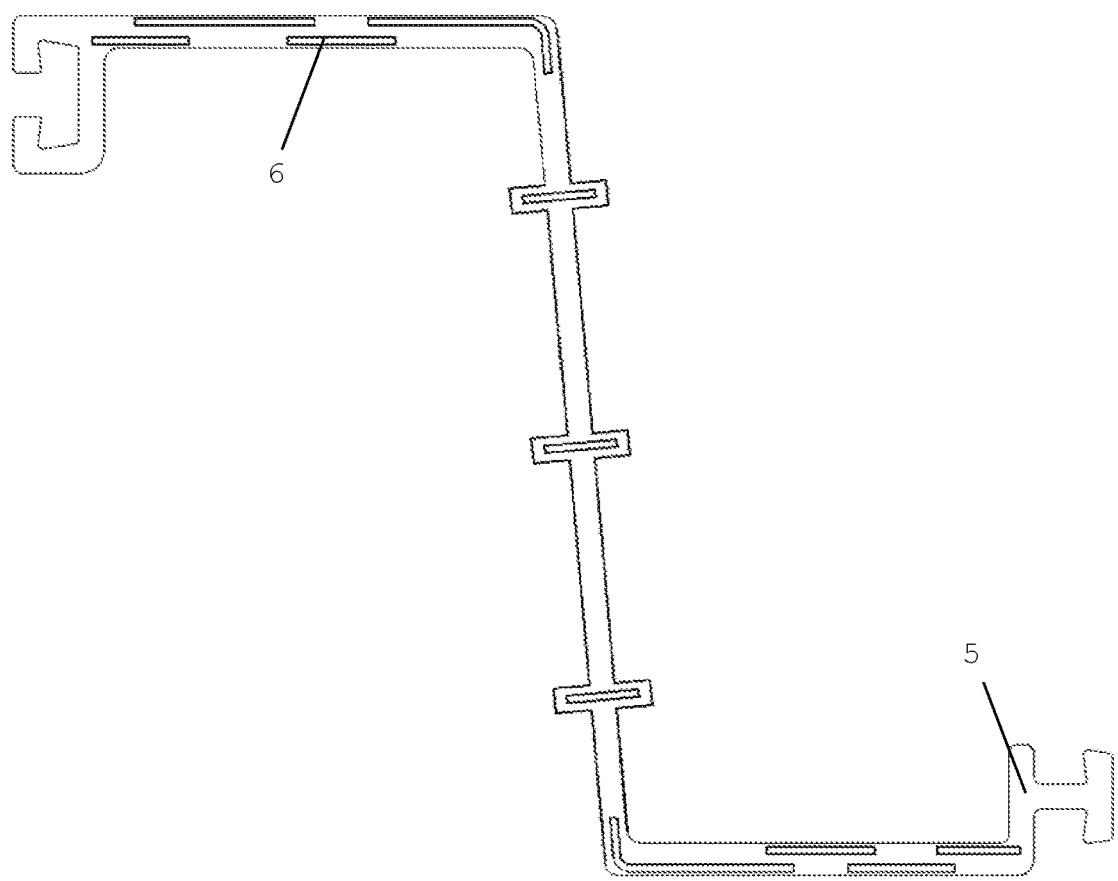
Figure 45:
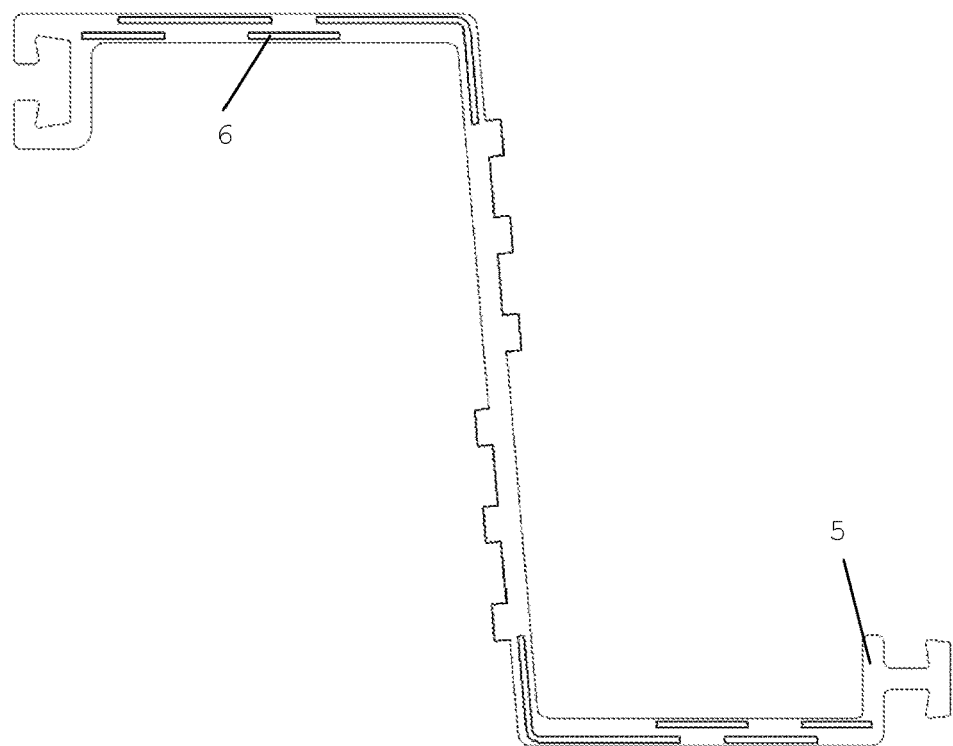
Figure 46:
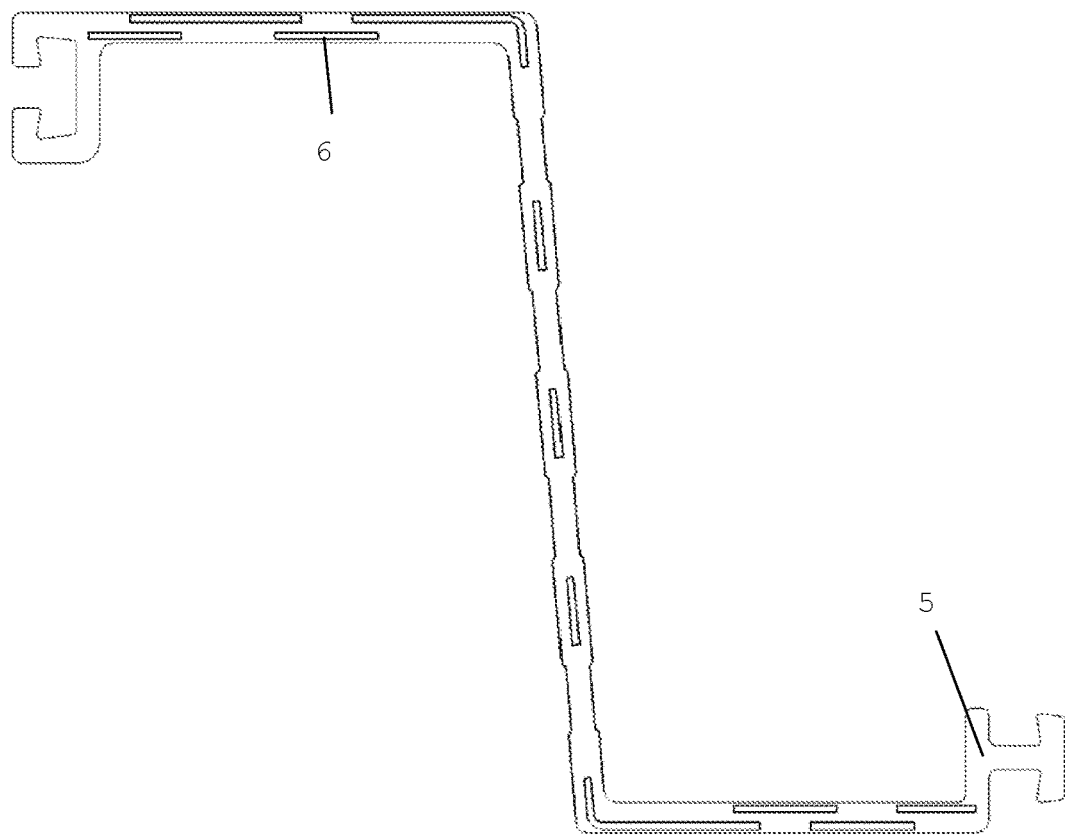

produced simultaneously or as part of a separate production process.

32 Claims, 32 Drawing Sheets

(51) Int. Cl.
| | |
|---|---|
| *B32B 27/04* | (2006.01) |
| *B32B 27/12* | (2006.01) |
| *E02B 3/10* | (2006.01) |
| *E02B 3/12* | (2006.01) |
| *E02D 29/02* | (2006.01) |
| *E02D 5/14* | (2006.01) |
| *E02D 5/02* | (2006.01) |

(52) U.S. Cl.
CPC .............. *E02B 3/108* (2013.01); *E02B 3/126* (2013.01); *E02D 5/02* (2013.01); *E02D 5/14* (2013.01); *E02D 29/02* (2013.01); *B32B 2255/102* (2013.01); *B32B 2262/0215* (2013.01); *B32B 2262/0238* (2013.01); *B32B 2262/0284* (2013.01); *B32B 2262/101* (2013.01)

(56) References Cited

U.S. PATENT DOCUMENTS

| | | | | |
|---|---|---|---|---|
| 4,543,288 | A † | 9/1985 | Radvan | |
| 4,938,823 | A † | 7/1990 | Balazek | |
| 5,401,122 | A * | 3/1995 | Pate, Jr. | ................. E02D 17/08 |
| | | | | 405/133 |
| 5,585,155 | A † | 12/1996 | Heikkila | |
| 5,779,961 | A † | 7/1998 | Teutsch | |
| 6,000,883 | A † | 12/1999 | Irvine | |
| 6,053,666 | A | 4/2000 | Irvine et al. | |
| 7,025,539 | B2 * | 4/2006 | Irvine | ....................... E02D 5/03 |
| | | | | 405/272 |
| 9,528,002 | B2 † | 12/2016 | Bloyaert | |
| 2004/0001941 | A1 | 1/2004 | Kusek | |
| 2004/0013901 | A1 | 1/2004 | Irvine et al. | |
| 2005/0100700 | A1 † | 5/2005 | Frabbi | |
| 2011/0306255 | A1 * | 12/2011 | Rathenow | ............... C04B 28/26 |
| | | | | 442/1 |
| 2014/0094543 | A1 | 4/2014 | Bloyaert et al. | |
| 2015/0308115 | A1 † | 10/2015 | Guhde et al. | |

FOREIGN PATENT DOCUMENTS

| | | |
|---|---|---|
| CN | 203113311 U | 8/2013 |
| CN | 103758114 A | 4/2014 |
| CN | 203701073 U | 7/2014 |
| KR | 20130129112 A | 11/2013 |

\* cited by examiner
† cited by third party

GEOTECHNICAL PROFILES AND A METHOD OF MANUFACTURE OF GEOTECHNICAL PROFILES

The subject of this invention is the method of manufacture of reinforced geotechnical profiles, particularly sheet piling profiles and mobile flood prevention devices and geotechnical profiles, particularly sheet piling profiles and mobile flood prevention devices manufactured in this manner, intended for geotechnical purposes. The method of manufacture of geotechnical profiles allows for forming various profiles applied in civil and marine engineering, as exemplified by sheet piling profiles and mobile flood prevention devices profiles.

Sheet piling profiles are commonly known and frequently used to reinforce embankments or the shorelines of water reservoirs or watercourses. They constitute an alternative to perishable wooden piles requiring periodical maintenance procedures, as well as expensive engineering structures in the form of concrete breakwaters. They are used, among others, to reinforce and secure water reservoirs and waterbeds, as well as earth structures to increase their watertightness and to elevate the tip of river, watercourse and water reservoir embankments and earth structures, to construct water ducts, levees as anti-filtration shields (in drainage, reclamation, irrigation works and site works to protect against the migration of contaminants), as walls used in the construction and division of water reservoirs, tanks and other fluids, including wastewater treatment plants, for stabilizing excavations and as material for constructing light retaining walls, as anti-erosion protection of reservoirs and watercourses, as anti-chemical shields, as elements of shaping green areas, and to build weirs and road and railway structures. Sheet metal walls are made of steel, concrete, plastic or structural wood.

Mobile flood prevention devices aim at temporarily securing areas threatened by floods by creating a water-tight wall. All of the currently applied solutions assume systems of aluminum profiles, sandwich boards, gabion and plastic systems, water-filled sleeves or profiles.

Due to the desire to increase the durability and strength of geotechnical profiles while reducing the costs of their production, and to reduce or at least maintain the current material consumption and thickness of geotechnical profile walls, their structure is reinforced with additional layers made from various elements.

Among the recorded patents regarding geotechnical profiles, the majority focus on technical solutions regarding sheet piling profiles.

Patent description ref. KR 20130129112 presents an at least two-layer sheet piling profiles made of polymer plastic. The internal layer of the sheet piling profiles is reinforced with glass fiber, and its external layer—with carbon fiber, which constitute the polymer coat enclosed by these layers. The matrix is made of thermoset resins.

In turn, utility model description ref. CN 203701073 presents a structure, in which areas which are particularly prone local buckling are reinforced at the stage of manufacture, locally producing a composite which constitutes the local stiffening, usually an extension of the sheet pile wall. The matrix is made of thermoset resins.

A method of reinforcing sheet piling profiles is also familiar from patent ref. CN 203113311, in which the durability of surfaces near the edges of the sheet piling profiles and the edges themselves is increased. The structure of these surfaces comprises glass fiber immersed in resin, which prevents the sheet pile wall from damaging, particularly during its driving into the ground. The matrix is made of thermoset resins.

Other familiar methods of manufacture of reinforced plastic profiles consist in continuous formation of profiles applying the pultrusion method, in which continuous fibers are stretched and pulled through an impregnation tank with liquid thermosetting resin and through heated forming dies. The pultrusion technological line also includes profile-heating and pulling devices powered by hydraulic actuators and devices cutting the profiles to desired sections. To produce higher crosswise durability, a combination of continuous fibers in the form of roving and glass fabrics and mats are used.

A modification of the aforementioned method and a device used for this purpose is described in patent ref. US 20040001941 concerning both a pultrusion device and the technology itself. Fibers in continuous form are preferably coated with an adhesion promotor and are fed from spools and entered to liquid plastisol to increase the adhesion of polymers to fibers at further stages of the process. The fibers used can be natural or artificial fibers, they can also form fabrics, unwoven fabrics vinyl chloride polymers are preferably homopolymers. In addition, at the stage of gelling, infrared radiation is entered to heat the plastisol and cure the surface of the fiber beams formed into bars. The process of plastisol pultrusion produces reinforcing bars, which are entered to the extruded profiles in the process of co-extrusion.

Known geotechnical profiles reinforced with steel or aluminum profiles have occurred solely in configuration with thermosetting plastics. The use of thermosetting plastics in the known solutions prevents the optimization of geotechnical profile durability in relation to the thickness of their walls (even in the case of steel and aluminum cores), and excludes easy recycling of plastics processed in this manner. The question of recycling is particularly important, since, affected by environmental factors, geotechnical profiles exhibit limited usage periods, and their repurposing while improving the remaining usage parameters solves the problem of waste. Therefore, the goal was to develop a geotechnical profile and its manufacture method, which would allow for increasing the durability of the sheet pile wall without increasing its weight, for instance by introducing steel or aluminum profiles, without increasing the overall production costs and providing for the recycling of used or damaged geotechnical profiles.

The method of manufacture of reinforced geotechnical profiles according to the aspects of the present disclosure consists in the plasticization of thermoplastic material, preferably hard and high-impact, polyvinyl chloride (PVC) and/or polyethylene terephthalate (PET) and/or polyethylene or polythene (PE) and/or acrylonitrile butadiene styrene (ABS) and/or polypropylene (PP), in a presser, after which it is extruded through an cross die unit and internal reinforcing profiles in the form of flat bars, arched elements, angled elements, ribbed profiles or sections of any geometry are entered to it in the entire volume, and at least in selected geotechnical profile cross-section areas, whereas these profiles are created from continuous and/or chopped fiber produced simultaneously or as part of a separate production process. Preferably, the fiber entered to the structure of the geotechnical profile is glass, polyester, basalt, aramid, polyamide, steel or natural, plant or animal fiber. Also preferably, the fiber is produced applying the pultrusion method, coating continuous fibers with selected plastic, i.e. PVC and/or PET and/or PE and/or ABS and/or PP. The internal reinforcing profiles are entirely surrounded with non-reinforced thermoplastic matrix and/or thermoplastic matrix reinforced with dispersed reinforcement, which aim at protecting the fiber against degradation in the working environment. The minimum thickness of the thermoplastic matrix is 0.1 mm. The internal reinforcing profiles can be obtained through calendering of continuous fiber beams, mats and fabrics coated with an impregnate compatible with the polymer matrix, preferably plastisol or hydrogel, or by calibrating continuous fibers, mats and fabrics made of hybrid fibers containing, apart from the basic reinforcing fibers, fibers made of thermoplastic materials.

A reinforced geotechnical profile according to the invention is manufactured out of thermoplastic material, preferably hard and high-impact, PVC and/or PET and/or PE and/or ABS and/or PP, in which reinforcement in the form of continuous fibers preferably coated with an adhesion promotor selected from among glass, basalt, polyester, aramid, polyamide, steel or natural, plant or animal fiber are entered locally or at least in selected cross-section areas, and then stabilized and maintained in position by a layer/coat made of PVC and/or PET and/or PE and/or ABS and/or PP, which is permanently and inseparably connected to the continuous fibers. The internal reinforcing profiles contain from 30-90% of the weight of the reinforcing fibers, preferably 70% of the fibers selected from among glass, basalt, aramid, polyamide, steel or natural, plant or animal fiber, and impregnate compatible with the polymer matrix or thermoplastic hybrid fibers in a quantity constituting 10-70% of the overall weight of the reinforcing profile, preferably 20-30%. The percentage amount of reinforcing fibers, preferably fibers selected from among glass, basalt, aramid, polyamide, steel or natural, plant or animal fibers is 5-50%, preferably 12-16% in relation to the overall sheet piling profiles weight.

Internal reinforcing profiles are placed inside the walls of geotechnical profiles situated the farthest from the bending axis of the geotechnical profile. Internal reinforcing profiles are installed in one, two or multiple layers and are completely surrounded with the polymer matrix. Preferably, the internal reinforcing profiles are flat bars and/or angled elements and/or ribbed profiles in a single- and/or two-layer arrangement, preferably of varying widths. Also preferably, the internal reinforcing profiles can be continuous.

The minimum thickness of the polymer matrix in the cross-section containing internal reinforcing profiles is 0.1 mm. The polymer matrix is made of thermoplastic material, which can be reinforced with dispersed reinforcement made of chopped fibers.

The process of calendaring or calibrating the internal reinforcing profiles is conducted at temperatures allowing for thermal fusion of the impregnate or adhesion promotor compatible with the polymer matrix or with the thermoplastic hybrid fibers. The process of melting the impregnate or the fibers is conducted with the use of elements generating pressure in the form of heated slide elements—calibrators, or with the use of horizontal and vertical, single-roller, two-roller or multi-roller calendering units, preferably with heated calenders at 50-350° C.

Preferably, the reinforcing fibers are coated with a surface preparation or an adhesion promotor, which facilitate fiber impregnation with an impregnate compatible with the thermoplastic matrix.

Preferably, the hybrid fibers are the hybrid fibers of glass fibers with fibers made of thermoplastic materials, such as PET, PE, PVC or PP.

Preferably, in the process of co-extrusion, all external surfaces of geotechnical profiles are coated with a layer of thermoplastic material of at least 0.5 mm in total thickness using a long presser.

The coarseness (tex) of the reinforcing fibers used must be contained between 600-5000 tex, preferably 1 000-3 000 tex. The thickness of the internal reinforcing profiles entered to the geotechnical profile is 0.5-6 mm, preferably 1.5-2.5 mm. Preferably, the width of internal reinforcing profiles in the form of flat bars, entered to the sheet pile wall profile or to the geotechnical profiles is 5-100 mm, preferably 10-50 mm, whereas particular profiles can differ in width.

Preferably, the sheet piling profiles according to the invention has a primary shape of the letter Z, S, U, Π, T or Ω, or is a hollow profile and contains at least one lock, preferably two locks with mutually complementary shapes. In another, beneficial embodiment of the invention, a mobile flood prevention dam comprises at least two geotechnical profiles with external reinforcing profiles, including a single- or multi-chamber, hollow flood prevention dam wall and a load-bearing profile pillar, preferably a double T-section with proper rigidity, sufficient for founding it in the soil and guaranteeing water-tight installation of the flood prevention dam wall panels.

The profiles of flood prevention dams include seals applied using the co-extrusion method or applying any other method, guaranteeing the water-tightness of the profiles under the pressure of water.

Figure 47:
Figure 48:
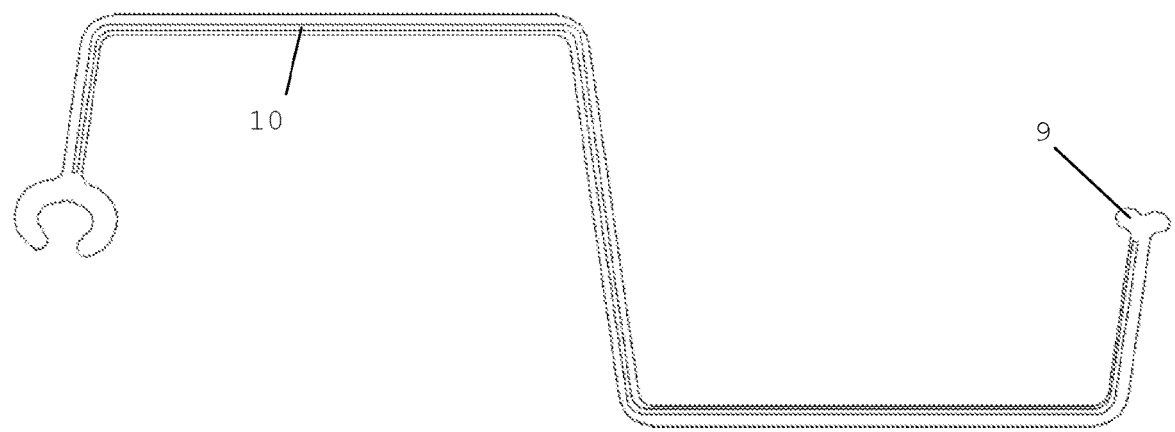
Figure 49:
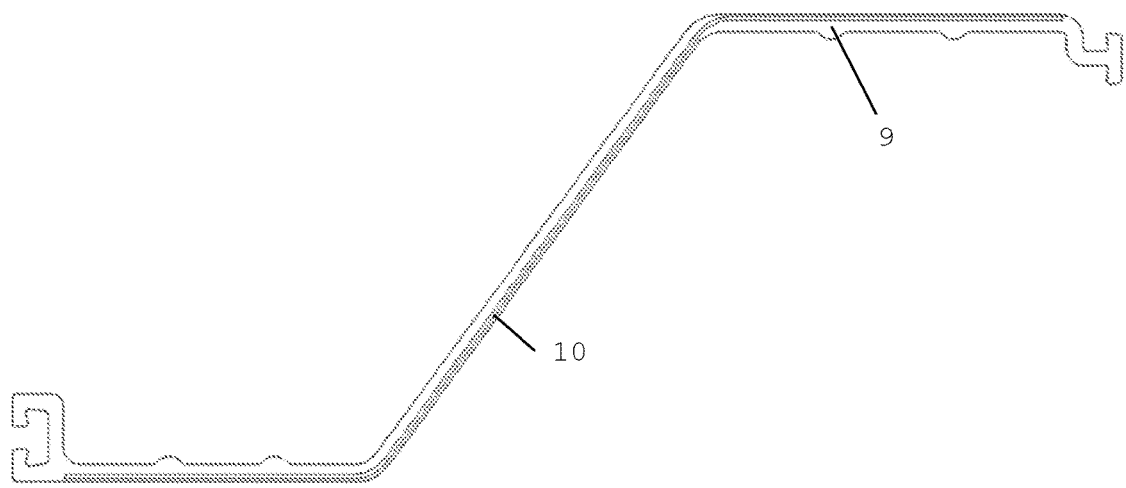
Figure 50:
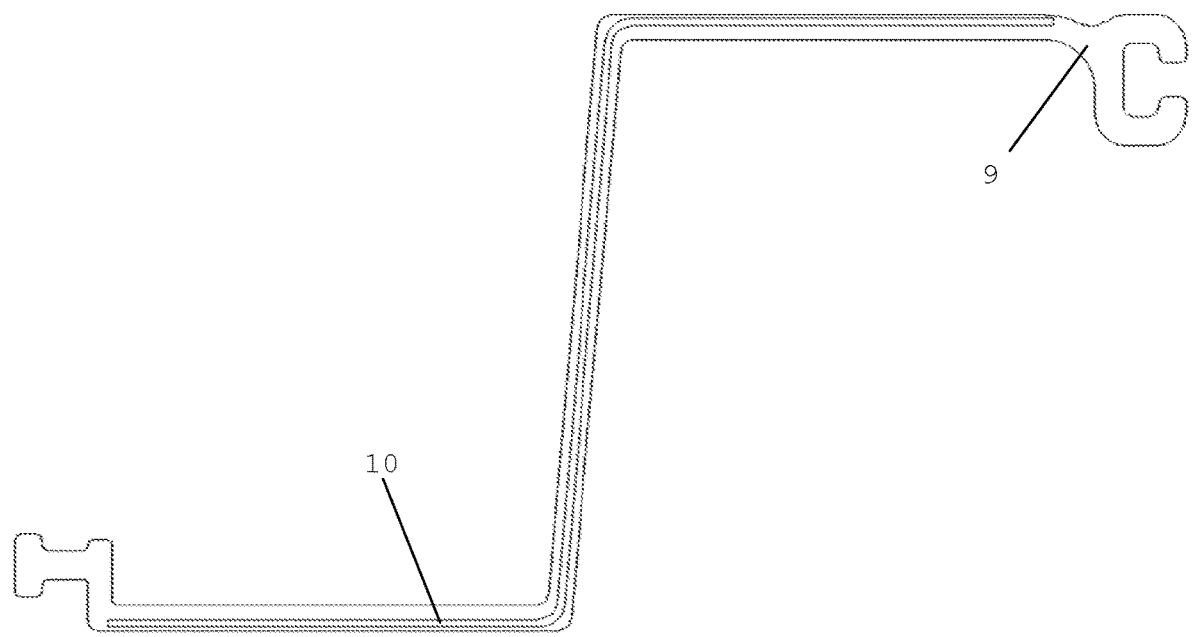
Figure 51:
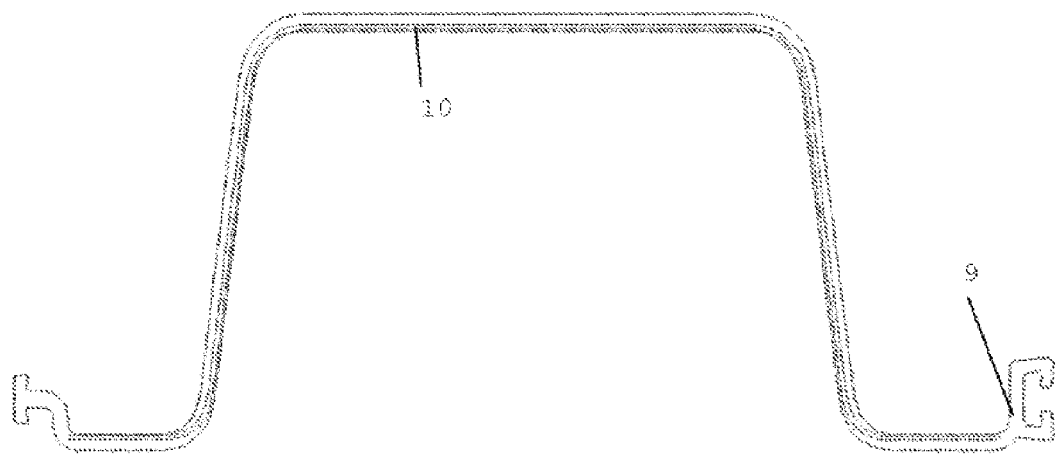
Figure 52:
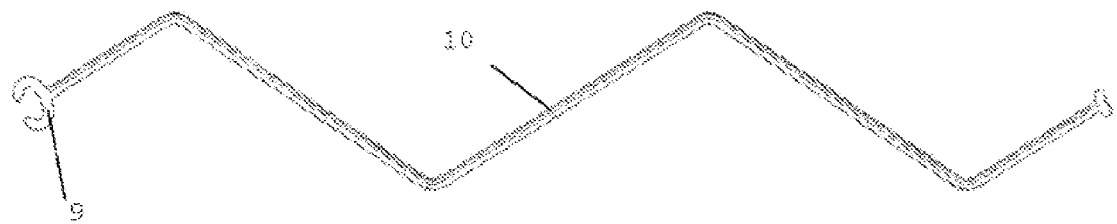
Figure 53:
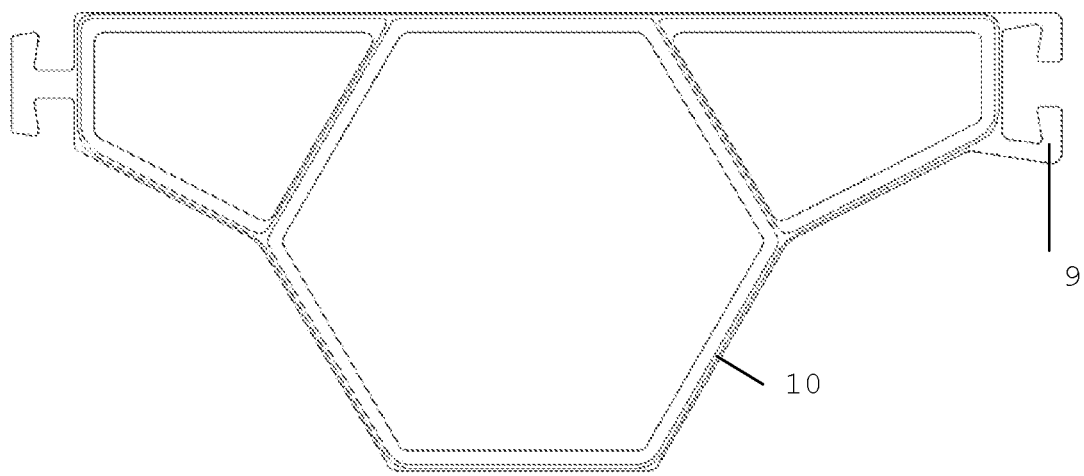
Figure 54:
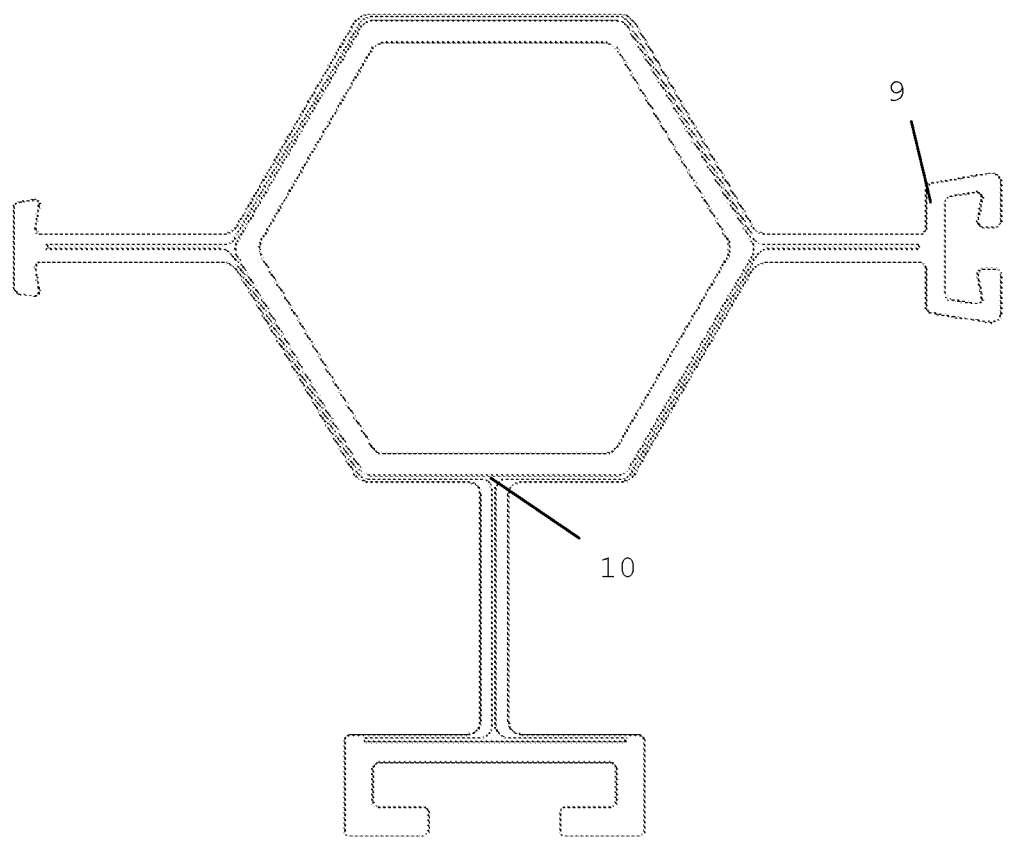
Figure 55:
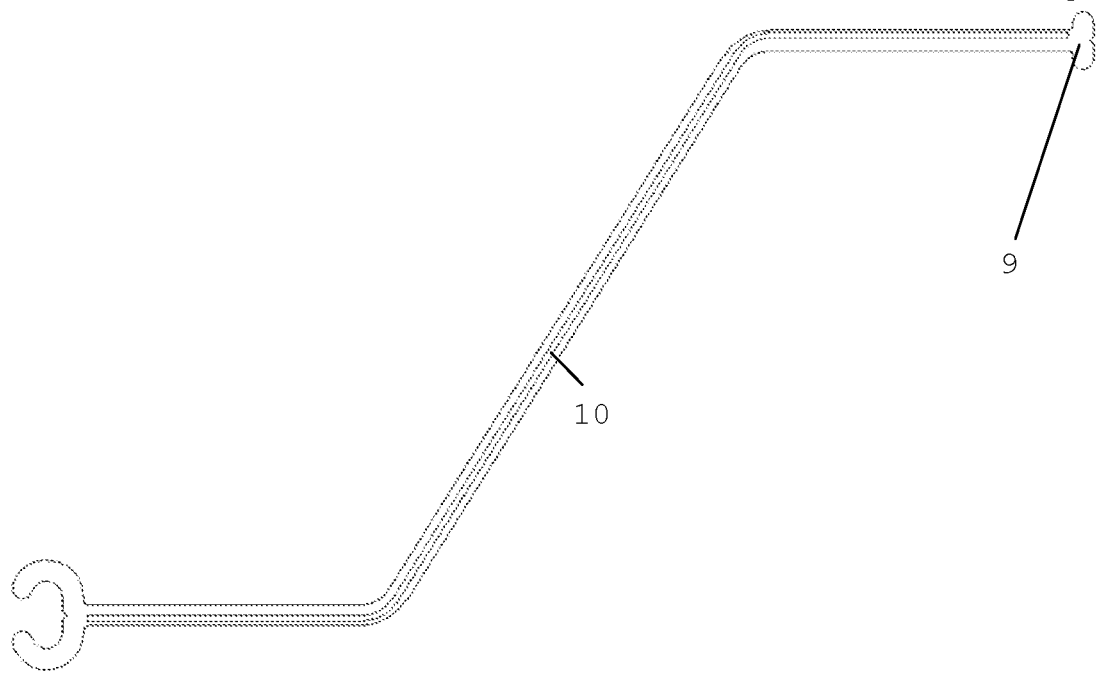
Figure 56:
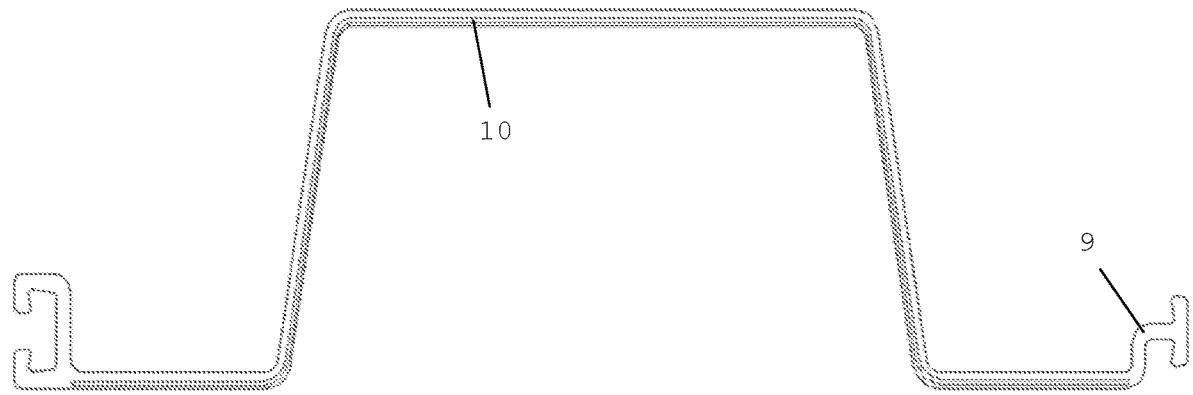
Figure 57:
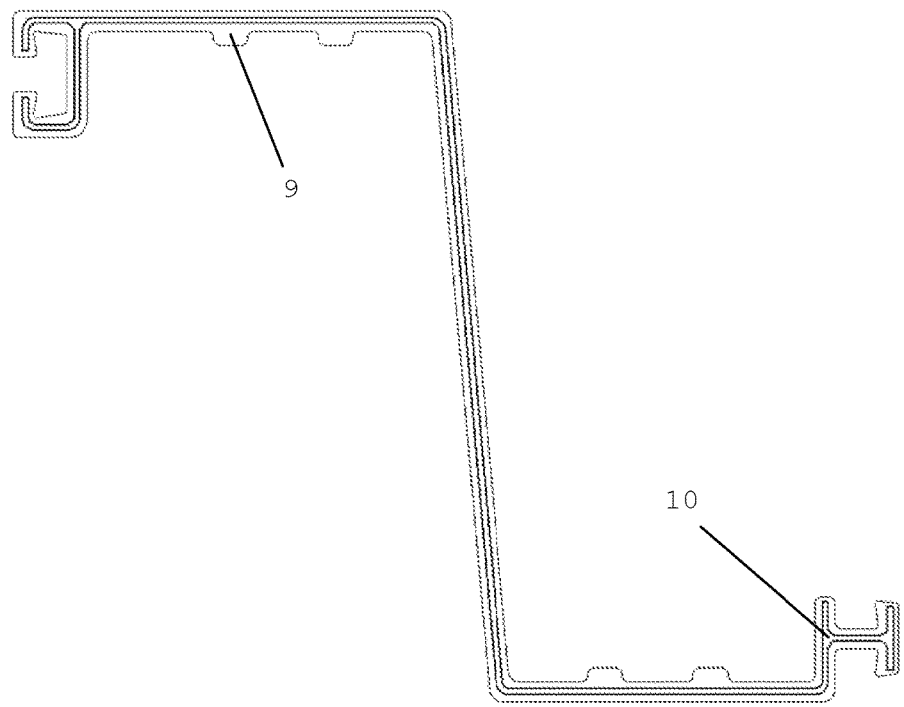
Figure 58:
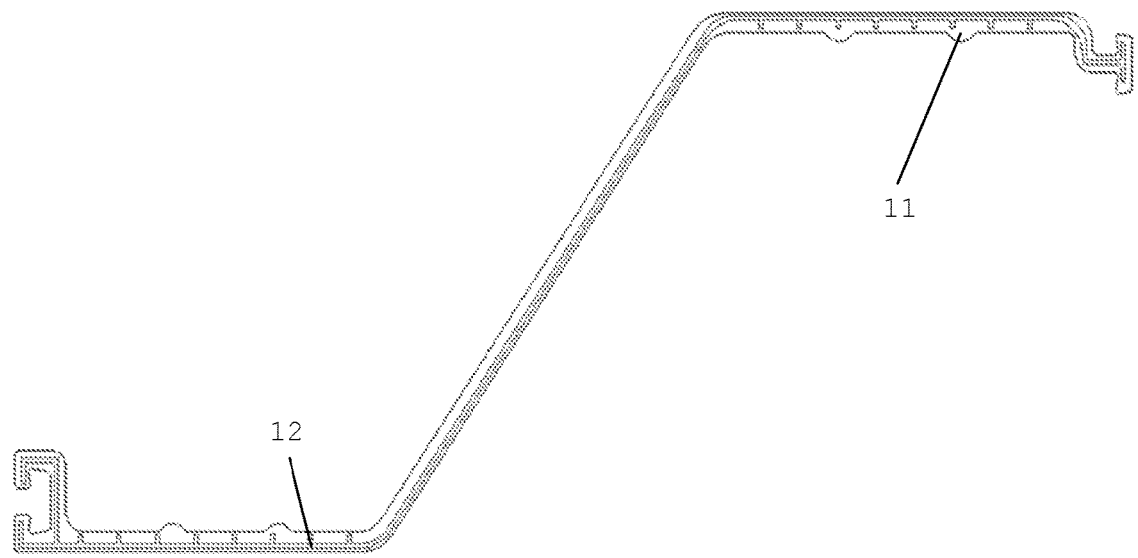
Figure 59:
Figure 60:
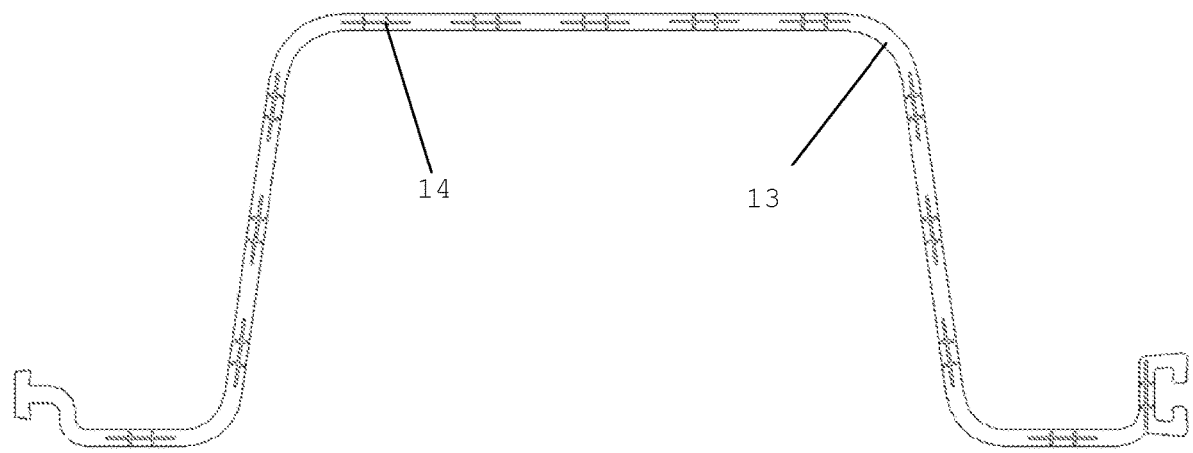
Figure 61:
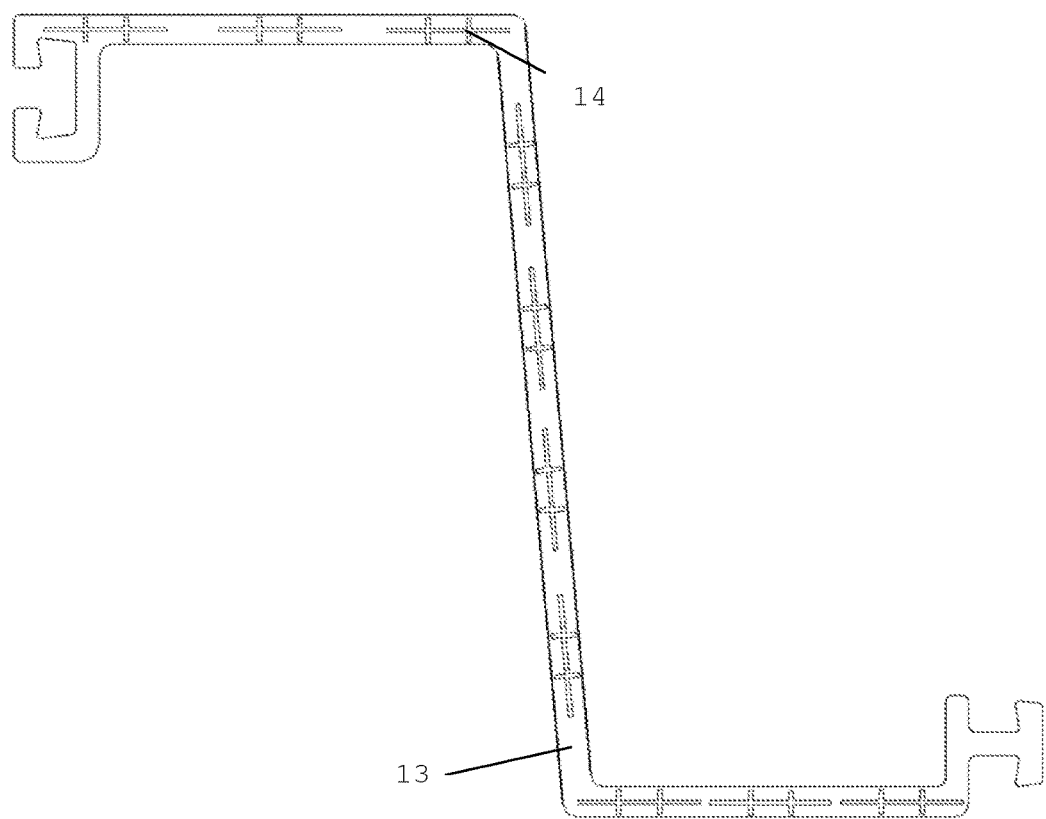
Figure 62:
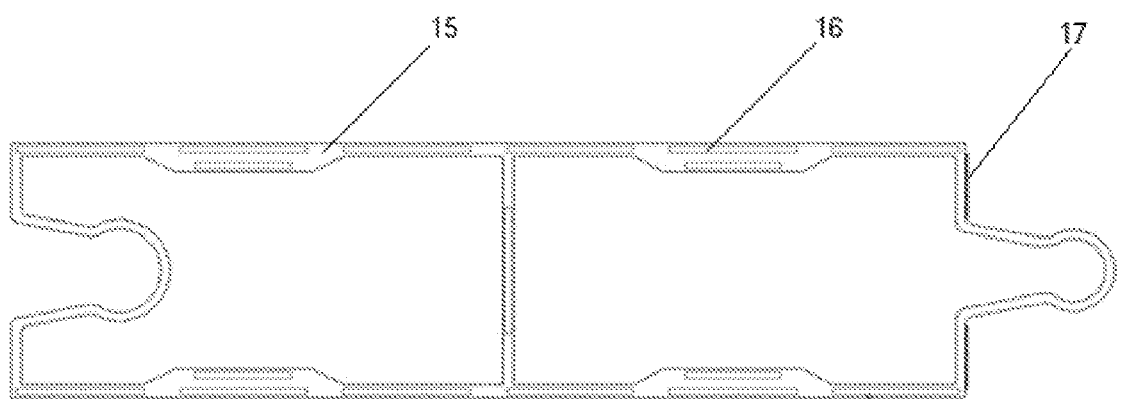
Figure 63:
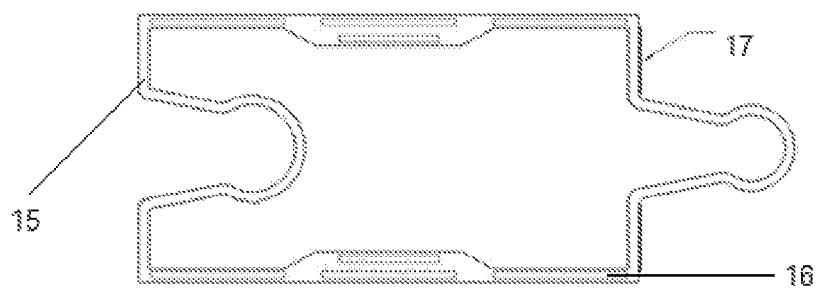
Figure 64:
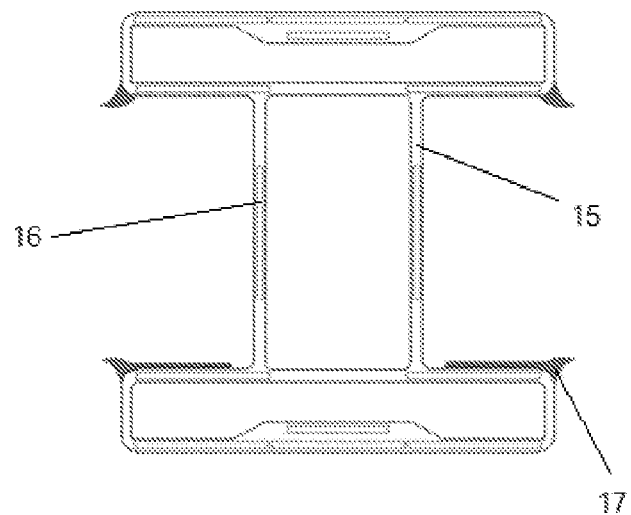

The geotechnical profiles manufactured with the method according to the invention have been presented in the figure, in which FIG. 1, FIG. 2, FIG. 3, FIG. 4, FIG. 5, FIG. 6, FIG. 7, FIG. 8, FIG. 9, FIG. 10, FIG. 11, FIG. 12 present the cross-section of the sheet piling profiles with internal reinforcing profiles in the two-layer arrangement, FIG. 13, FIG. 14, FIG. 15, FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, FIG. 30 present the cross-section of the sheet piling profiles with internal reinforcing profiles in the single-layer arrangement, FIG. 31, FIG. 32, FIG. 33, FIG. 34, FIG. 35, FIG. 36, FIG. 37, FIG. 38, FIG. 39, FIG. 40, FIG. 41, FIG. 42, FIG. 43, FIG. 44, FIG. 45, FIG. 46, FIG. 56 present the cross-section of the sheet piling profiles internal reinforcing profiles in the single- and two-layer arrangement, FIG. 47 presents the cross-section of the sheet piling profiles with continuous internal reinforcing profiles in the two-layer arrangement, FIG. 48, FIG. 49, FIG. 50, FIG. 51, FIG. 52, FIG. 53, FIG. 54, FIG. 55, FIG. 57, FIG. 58, FIG. 59 present the cross-section of the sheet piling profiles with continuous internal reinforcing profiles in the single-layer arrangement, FIGS. 60 and 61 present reinforcement with an internal, single-layer, continuous ribbed profile, and FIGS. 62 and 63 present reinforcement with internal, ribbed reinforcing profiles in the single-layer arrangement, FIG. 64 presents the cross-section of the profiles of mobile water prevention dams with external reinforcing profiles in the two-layer arrangement.

EXAMPLE I

A geotechnical profile in the form of a sheet piling profiles 1 was manufactured in a manner that hard and high-impact PVC was plasticized in an extruder, after which it was extruded through an cross die unit and internal reinforcing profiles 2 in the form of flat bars and angled elements were entered into it in selected areas of the cross-section of the geotechnical profile 1. The internal reinforcing profiles 2 were installed in two layers and completely surrounded with polymer matrix. The profiles were made of continuous fiber, simultaneously manufactured. The fiber entered to the structure of the geotechnical profile is glass fiber. The internal reinforcing profiles 2 are completely surrounded with non-reinforced, thermoplastic matrix, the purpose of which is to protect the continuous fibers against degradation in the working environment. The minimum thickness of the thermoplastic matrix is 1 mm. The internal reinforcing profiles 2 were produced through calendering of continuous fiber beams with impregnate compatible with the polymer matrix—plastisol. The internal reinforcing profiles 2 contain 80% glass fibers. The percentage content of reinforcing fibers is 12% in relation to the overall weight of the sheet pile wall profile 1. The internal reinforcing profiles 2 are installed in the walls of the geotechnical profiles 1 situated the farthest from the bending axis. The process of calendering internal reinforcing profiles 2 is conducted with the use of horizontal and vertical, two-roller calendering units with heated calenders at 100° C. The coarseness (tex) of the reinforcing fibers used is 3000 tex. The thickness of internal reinforcing profiles entered to the geotechnical profile is 2 mm. The width of internal reinforcing profiles 2 in the form of flat bars, entered to the sheet pile wall profile 1 is 20 and 35 mm.

EXAMPLE II

A geotechnical profile in the form of a sheet piling profiles 1 was manufactured in a manner that hard and high-impact PVC was plasticized in an extruder, after which it was pressed through an cross die unit and internal reinforcing profiles 2 in the form of flat bars and angle irons were entered into it in selected areas of the cross-section of the geotechnical profile 1. The internal reinforcing profiles 2 were installed in two layers and completely surrounded with polymer matrix. The profiles were made of continuous fiber, simultaneously manufactured. The fiber entered to the structure of the geotechnical profile is hybrid PET fiber/glass fiber. The internal reinforcing profiles 2 are completely surrounded with non-reinforced, thermoplastic matrix, the purpose of which is to protect the continuous fibers against degradation in the working environment. The minimum thickness of the thermoplastic matrix is 1 mm. The internal reinforcing profiles 2 were produced through calendering and calibration of continuous hybrid PET/glass fiber beams. The internal reinforcing profiles 2 comprise hybrid fibers including 70% of glass fibers and 30% of PET fibers. The percentage content of reinforcing fibers is 13% in relation to the overall weight of the sheet pile wall profile 1. The internal reinforcing profiles 2 are installed in the walls of the geotechnical profiles 1 situated the farthest from the bending axis of the geotechnical profile. The process of calendering and calibration of internal reinforcing profiles 2 is conducted with the use of horizontal and vertical, single- and two-roller calendering units with heated calenders and calibrators at varying temperatures in the range from 220 to 300° C. The coarseness (tex) of the reinforcing fibers used is 2700 tex. The thickness of internal reinforcing profiles entered to the geotechnical profile is 2 mm. The width of internal reinforcing profiles 2 in the form of flat bars, entered to the sheet pile wall profile 1 is 30 mm.

EXAMPLE III

A geotechnical profile in the form of a sheet piling profiles 3 was manufactured in a manner that hard and high-impact PVC was plasticized in an extruder, after which it was pressed through an cross die unit and internal reinforcing profiles 4 in the form of flat bars and angled elements were entered into it in selected areas of the cross-section of the geotechnical profile 1. The internal reinforcing profiles 4 were installed in one layer and completely surrounded with polymer matrix. The profiles were made of continuous fiber, simultaneously manufactured. The fiber entered to the structure of the geotechnical profile 3 is hybrid PET fiber/glass fiber. The internal reinforcing profiles 4 are completely surrounded with dispersed reinforcement comprising chopped fibers, the purpose of which is to protect the continuous fibers against degradation in the working environment. The minimum thickness of the thermoplastic matrix is 1.5 mm. The percentage content of chopped glass fiber reinforcing the thermoplastic matrix is 30%. The internal reinforcing profiles 4 were produced through calendering continuous hybrid PET/glass fiber beams. The internal reinforcing profiles include 80% of hybrid PET fibers. The percentage content of reinforcing fibers is 14% in relation to the overall weight of the sheet pile wall profile 3. The internal reinforcing profiles are installed in the walls of the geotechnical profiles 3 situated the farthest from the bending axis of the geotechnical profile. The process of calendering and calibration of internal reinforcing profiles is conducted with the use of horizontal and vertical, two-roller calendering units with heated calenders and calibrators at 220° C. The coarseness (tex) of the reinforcing fibers used is 2500 tex. The thickness of internal reinforcing profiles 4 entered to the geotechnical profile 3 is 2 mm. The width of internal reinforcing profiles 4 in the form of flat bars, entered to the sheet pile wall profile 3 is 30 mm.

EXAMPLE IV

A geotechnical profile in the form of a sheet piling profiles 3 was manufactured in a manner that hard and high-impact PVC was plasticized in an extruder, after which it was pressed through an cross die unit and internal reinforcing profiles 4 in the form of flat bars and angled elements were entered into it in selected areas of the cross-section of the geotechnical profile. The internal reinforcing profiles 4 were installed in one layer and completely surrounded with polymer matrix. The profiles were made of continuous fiber, simultaneously manufactured. The fiber entered to the structure of the geotechnical profile is hybrid PET fiber/glass fiber. The internal reinforcing profiles 4 are completely surrounded with non-reinforced thermoplastic matrix, the purpose of which is to protect the continuous fibers against degradation in the working environment. The minimum thickness of the thermoplastic matrix is 1.2 mm. The internal reinforcing profiles 4 were produced through calendering and calibration of continuous hybrid PET/glass fiber beams. The internal reinforcing profiles comprise hybrid fibers including 80% of glass fiber and 20% PET fiber in relation to the overall weight of the sheet piling profile 5. The percentage content of reinforcing fibers is 14% in relation to the overall weight of the sheet pile wall profile 3. The internal reinforcing profiles are installed in the walls of the geotechnical profiles 3 situated the farthest from the bending axis of the geotechnical profile. The process of calendering and calibration of internal reinforcing profiles 4 is conducted with the use of horizontal and vertical, single- and two-roller calendering units with heated calenders and calibrators at varying temperatures in the range from 220 to 300° C. The coarseness (tex) of the reinforcing fibers used is 1600 tex. The thickness of internal reinforcing profiles entered to the geotechnical profile 2.5 mm. The width of internal reinforcing profiles 4 in the form of flat bars, entered to the sheet pile wall profile 3 is 25-40 mm.

EXAMPLE V

A geotechnical profile in the form of a sheet piling profiles 5 was manufactured in a manner that hard and high-impact PVC was plasticized in an extruder, after which it was pressed through an cross die unit and internal reinforcing profiles 6 in the form of flat bars and angle irons were entered into it in selected areas of the cross-section of the geotechnical profile. The internal reinforcing profiles 6 were installed in one and two layers and completely surrounded with polymer matrix. The profiles 6 were made of continuous fiber, simultaneously manufactured. The fiber entered to the structure of the geotechnical profile 5 is hybrid PVC fiber/glass fiber. The internal reinforcing profiles 6 are completely surrounded with thermoplastic matrix reinforced with dispersed reinforcement made of cut fibers, the purpose of which is to protect the continuous fibers against degradation in the working environment. The minimum thickness of the thermoplastic matrix is 1.2 mm. The percentage content of chopped glass fiber reinforcing the thermoplastic matrix is 25% in relation to the overall weight of the thermoplastic material. The internal reinforcing profiles 4 were produced through calendering continuous fibers coated with impregnate compatible with the polymer matrix—plastisol. The internal reinforcing profiles 6 made of hybrid fibers include 80% of glass fiber and 20% of PVC fiber in relation to the overall sheet pile wall profile weight. The internal reinforcing profiles 6 are installed in the walls of the geotechnical profiles 5 situated the farthest from the bending axis of the geotechnical profile. The process of calendering internal reinforcing profiles is conducted with the use of horizontal and vertical, two-roller calendering units with heated calenders at 100° C. The coarseness (tex) of the reinforcing fibers used is 3000 tex. The thickness of internal reinforcing profiles 6 entered to the geotechnical profile 5 is 2.2 mm. The width of internal reinforcing profiles 6 in the form of flat bars, entered to the sheet pile wall profile 5 is 20 and 40 mm.

EXAMPLE VI

A geotechnical profile in the form of a sheet piling profiles 5 was manufactured in a manner that recycled PET, e.g. flakes obtained from the recycling of PET bottles, was plasticized in an extruder, after which it was pressed through an cross die unit and internal reinforcing profiles 6 in the form of flat bars and angled elements were entered into it in selected areas of the cross-section of the geotechnical profile. The internal reinforcing profiles 6 were installed in one and two layers and completely surrounded with polymer matrix. The profiles 6 were made of continuous fiber, manufactured in an independent process. The fiber entered to the structure of the geotechnical profile 5 is hybrid PET fiber/glass fiber. The internal reinforcing profiles 6 are completely surrounded with non-reinforced thermoplastic matrix, the purpose of which is to protect the continuous fibers against degradation in the working environment. The minimum thickness of the thermoplastic matrix is 1 mm. The internal reinforcing profiles 6 were produced through calendering and calibration of continuous hybrid PET/glass fibers. The internal reinforcing profiles 6 made of hybrid fibers include 80% of glass fiber and 20% of PET fiber in relation to the overall sheet piling profile 5 weight. The internal reinforcing profiles 6 are installed in the walls of the geotechnical profiles 5 situated the farthest from the bending axis of the geotechnical profile. The process of calendering and calibration of internal reinforcing profiles 6 is conducted with the use of horizontal and vertical, single- and two-roller calendering units with heated calenders and calibrators at varying temperatures in the range from 220 to 300° C. The coarseness (tex) of the reinforcing fibers used is 2500 tex. The thickness of internal reinforcing profiles 6 entered to the geotechnical profile 5 is 2 mm. The width of internal reinforcing profiles 6 in the form of flat bars, entered to the sheet piling profile 5 is 30 mm. In the process of co-extrusion, all external surfaces of the sheet pile wall profile 5 are coated with a layer of virgin PET of 1 mm using an extruder.

EXAMPLE VII

A geotechnical profile in the form of a sheet piling profiles 5 was manufactured in a manner that recycled PET, e.g. flakes obtained from the recycling of PET bottles, was plasticized in an extruder, after which it was pressed through an cross die unit and internal reinforcing profiles 6 in the form of flat bars and angled elements were entered into it in selected areas of the cross-section of the geotechnical profile. The internal reinforcing profiles 6 were installed in one and two layers and completely surrounded with polymer matrix. The profiles 6 were made of continuous fiber, manufactured in an independent process. The fiber entered to the structure of the geotechnical profile 5 is hybrid PET fiber/carbon fiber. The internal reinforcing profiles 6 are completely surrounded with non-reinforced thermoplastic matrix, the purpose of which is to protect the continuous fibers against degradation in the working environment. The minimum thickness of the thermoplastic matrix is 1 mm. The internal reinforcing profiles 6 were produced through calendering and calibration of continuous hybrid PET/carbon fibers. The internal reinforcing profiles 6 are made of hybrid carbon fibers and 20% fibers in relation to the overall sheet pile wall profile 5 weight. The internal reinforcing profiles 6 are installed in the walls of the geotechnical profiles 5 situated the farthest from the bending axis of the geotechnical profile. The process of calendering and calibration of internal reinforcing profiles 6 is conducted with the use of horizontal and vertical, single- and two-roller calendering units with heated calenders and calibrators at varying temperatures in the range from 220 to 300° C. The coarseness (tex) of the reinforcing fibers used is 2500 tex. The thickness of internal reinforcing profiles 6 entered to the geotechnical profile 5 is 2 mm. The width of internal reinforcing profiles 6 in the form of flat bars entered to the sheet piling profile 5 is 30 mm. In the process of co-extrusion, all external surfaces of the sheet pile wall profile 5 are coated with a layer of virgin PET of 1 mm using an extruder.

EXAMPLE VIII

A geotechnical profile in the form of a sheet piling profile 7 was manufactured in a manner that recycled PET, e.g. flakes obtained from the recycling of PET bottles, was plasticized in an extruder, after which it was pressed through an cross die unit and internal reinforcing profiles 8 in the form of flat bars and angled elements, installed in one and two layers and completely surrounded with polymer matrix, were entered into it in selected areas of the cross-section of the geotechnical profile 7. The profiles 8 were made of continuous fiber, manufactured simultaneously. The fiber entered to the structure of the geotechnical profile 7 is hybrid PET fiber/glass fiber. The internal reinforcing profiles 6 are completely surrounded with thermoplastic matrix reinforced with dispersed reinforcement made of chopped fiber, the purpose of which is to protect the continuous fibers against degradation in the working environment. The minimum thickness of the thermoplastic matrix is 1 mm. The percentage content of chopped glass fiber reinforcing the thermoplastic matrix is 20%. The internal reinforcing profiles 8 were produced through calendering and calibration of continuous hybrid PET/glass fibers. The internal reinforcing profiles 6 are made of hybrid carbon fibers containing 80% of glass fiber and 20% PET fiber in relation to the overall sheet pile wall profile 7 weight. The internal reinforcing profiles 8 are installed in the walls of the geotechnical profiles 7 situated the farthest from the bending axis of the geotechnical profile. The process of calendering and calibration of internal reinforcing profiles 8 is conducted with the use of horizontal and vertical, single- and two-roller calendering units with heated calenders and calibrators at varying temperatures in the range from 220 to 300° C. The coarseness (tex) of the reinforcing fibers used is 2500 tex. The thickness of internal reinforcing profiles 8 entered to the geotechnical profile is 1.8 mm. The width of internal reinforcing profiles 8 in the form of flat bars, entered to the sheet piling profile 7 is 28 mm. In the process of co-extrusion, all external surfaces of the sheet piling profile 7 are coated with a layer of virgin PET of 1 mm using an extruder.

EXAMPLE IX

A geotechnical profile 9 was manufactured in a manner that polypropylene granulate was plasticized in a single screw extruder, after which it was pressed through an cross die unit and an internal reinforcing profile 10 in the form of a continuous flat bar completely surrounded with polymer matrix, was entered in the entire volume of the geotechnical profile 9. The profile 10 was made of continuous fiber, manufactured parallel (simultaneously). The fiber entered to the structure of the geotechnical profile is polypropylene hybrid fiber. The internal reinforcing profile is completely surrounded with non-reinforced thermoplastic matrix, the purpose of which is to protect the continuous fibers against degradation in the working environment. The minimum thickness of the thermoplastic matrix is 1.5 mm. The internal reinforcing profile 10 is made of hybrid PP/glass fibers containing 75% of glass fiber and 25% PP fiber. The percentage content of reinforcing fibers is 18% in relation to the overall weight of the sheet pile wall profile 9. The process of calendering internal reinforcing profiles is conducted with the use of horizontal and vertical, two-roller calendering units with heated calenders at 250° C. The coarseness (tex) of the reinforcing fibers used is 3000 tex. The thickness of the internal reinforcing profile 10 entered to the geotechnical profile 9 is 2.4 mm. The width of the internal reinforcing profile 10 in the form of a flat bar entered to the sheet piling profile 9 is 440 mm.

EXAMPLE X

A geotechnical profile in the form of a sheet piling profiles 9 was manufactured in a manner that polypropylene granulate was plasticized in a single screw extruder, after which it was pressed through an cross die unit and an internal reinforcing profile 10 in the form of flat bars and angled elements were entered in selected areas of the cross-section of the geotechnical profile 9. The profiles 10 were made of continuous fiber, manufactured simultaneously. The fiber entered to the structure of the geotechnical profile is polypropylene hybrid fiber. The fiber entered to the structure of the geotechnical profile is hybrid polypropylene fiber. The internal reinforcing profile 10 is completely surrounded with thermoplastic matrix reinforced with dispersed reinforcement made of cut fiber, the purpose of which is to protect the continuous fibers against degradation in the working environment. The minimum thickness of the thermoplastic matrix is 2 mm. The percentage content of the chopped glass fiber reinforcing the thermoplastic matrix is 30%. The internal reinforcing profile 10 was produced through calendering continuous fibers coated with impregnate compatible with the polymer matrix. The internal reinforcing profile 10 is made of hybrid PP/glass fibers containing 75% glass fiber and 25% PP fiber. The percentage content of the reinforcing fibers is 25% in relation to the overall sheet pile wall profile weight. The internal reinforcing profile 10 is installed in the walls of the geotechnical profiles 9 situated the farthest from the bending axis of the geotechnical profile. The process of calendering the internal reinforcing profile 10 is conducted with the use of horizontal and vertical, single- or two-roller calendering units with heated calenders at 250° C. The coarseness (tex) of the reinforcing fibers used is 3000 tex. The thickness of the internal reinforcing profile 10 entered to the geotechnical profile is 2.5 mm. The width of the internal reinforcing profile 10 in the form of a flat bar entered to the sheet pile wall profile or geotechnical profiles is 440 mm.

EXAMPLE XI

A geotechnical profile in the form of a sheet piling profiles 11 was manufactured in a manner that HDPE granulate was plasticized in a single screw extruder, after which it was pressed through an cross die unit and an internal, single-layer, ribbed profile 11 was entered in the entire volume of the geotechnical profile 11. The profile was made of continuous fiber, manufactured simultaneously. The fiber entered to the structure of the geotechnical profile is polypropylene hybrid fiber. The fiber entered to the structure of the geotechnical profile 11 is made of hybrid HDPE/glass fibers. The internal reinforcing profile 12 is completely surrounded with non-reinforced thermoplastic matrix, the purpose of which is to protect the continuous fibers against degradation in the working environment. The minimum thickness of the thermoplastic matrix is 2.5 mm. The internal reinforcing profile 12 was produced through calendering continuous hybrid PE/glass fibers. The internal reinforcing profile 12 is made of hybrid HDPE/glass fibers containing 75% glass fiber and 25% HDPE fiber. The percentage content of the reinforcing fibers is 30% in relation to the overall sheet piling profile weight. The internal reinforcing profile 12 is installed in the walls of the geotechnical profiles situated the farthest from the bending axis of the geotechnical profile. The process of calendering the internal reinforcing profile 12 is conducted with the use of horizontal and vertical, single- and two-roller calendering units with heated calenders at 200° C. The coarseness (tex) of the reinforcing fibers used is 3000 tex. The thickness of the internal reinforcing profile 12 entered to the geotechnical profile 11 is 2.5 mm. The width of the internal reinforcing profile 12 in the form of a flat bar entered to the sheet pile wall profile 11 is 860 mm.

EXAMPLE XII

A geotechnical profile 13 was manufactured in a manner that hard and high impact PVC was plasticized in an extruder, after which it was pressed through an cross die unit and internal reinforcing profiles 14 in the form of single-layer flat bars and angled elements were entered into it in selected areas of the cross-section of the geotechnical profile 13. The profiles 14 were made of continuous fiber, simultaneously manufactured. The fiber entered to the structure of the geotechnical profile is glass fiber. The internal reinforcing profiles 14 are completely surrounded with non-reinforced thermoplastic matrix, the purpose of which is to protect the continuous fibers against degradation in the working environment. The minimum thickness of the thermoplastic matrix is 1 mm. The internal reinforcing profiles 14 were produced through calendering continuous fibers coated with impregnate compatible with the polymer matrix—hydrogel. The internal reinforcing profiles 14 include 70% of glass fiber. The percentage content of reinforcing fibers is 15% in relation to the overall sheet pile wall profile 13 weight. The internal reinforcing profiles 14 are installed in the walls of the geotechnical profiles 13 situated the farthest from the bending axis of the geotechnical profile. The process of calendering and calibration of internal reinforcing profiles is conducted with the use of horizontal and vertical, two-roller calendering units with heated calenders at 100° C. The coarseness (tex) of the reinforcing fibers used is 3000 tex. The thickness of internal reinforcing profiles 14 entered to the geotechnical profile is 2.5 mm. The width of internal reinforcing profiles 14 in the form of ribbed flat bars entered to the sheet pile wall profile 13 is 20 and 35 mm.

EXAMPLE XIII

A geotechnical profile in the form of a mobile flood prevention dam was manufactured in a manner that hard and high-impact PVC was plasticized in an extruder, after which it was pressed through an cross die unit and internal reinforcing profiles 16 in the form of two-layer flat bars were entered into it in selected areas of the cross-section of the geotechnical profile 15. The profiles 16 were made of continuous fiber, simultaneously manufactured. The fiber entered to the structure of the geotechnical profile is glass fiber. The internal reinforcing profiles 16 are completely surrounded with non-reinforced thermoplastic matrix, the purpose of which is to protect the continuous fibers against degradation in the working environment. The minimum thickness of the thermoplastic matrix is 1 mm. The internal reinforcing profiles 16 were produced through calendering continuous fibers coated with impregnate compatible with the polymer matrix—hydrogel. The internal reinforcing profiles 16 include 70% of glass fiber. The percentage content of reinforcing fibers is 15% in relation to the overall sheet pile wall profile 15 weight. The internal reinforcing profiles 16 are installed in the walls of the geotechnical profiles 15 situated the farthest from the bending axis of the geotechnical profile. The process of calendering and calibration of internal reinforcing profiles is conducted with the use of horizontal and vertical, two-roller calendering units with heated calenders at 110° C. The coarseness (tex) of the reinforcing fibers used is 3000 tex. The thickness of internal reinforcing profiles 16 entered to the geotechnical profile is 2.5 mm. The width of internal reinforcing profiles 16 in the form of flat bars entered to the sheet piling profile 15 is 20 and 35 mm. Seals 17 were installed on the external surfaces of the profile 15.

One of the advantages of the geotechnical profiles according to the invention is their improved impact properties, higher relative deformation in relation to the thermosetting matrix, which results in lower cracking capacity. The fatigue strength of a sheet piling profiles comprising profiles reinforced with continuous fibers with a thermoplastic matrix is significantly higher to the currently used thermosetting matrix. Thermoplastic matrix is recyclable in terms of materials (after shredding, the waste generated from sheet piling profiles with thermoplastic matrix and reinforcing continuous fiber or cut fiber (dispersed) can be used to produce profiles with dispersed fiber reinforcement), which was impossible in the case of thermosetting matrices. Furthermore, the plastics used in the production of the sheet pile wall can come from recycling (high-impact vinyl chloride can come from the recycling of PVC window frames and PET—from bottle recycling), which significantly reduces the costs of the polymer matrix. The use of thermoplastic matrix facilitates the execution of various profile geometries (e.g. hollow sheet pile wall profiles). The use of thermoplastic matrix facilitates the application of thin external layers by applying the co-extrusion technology, which improves the operational parameters of the products: in the case of thermoplastic matrix made of recycled PVC, it protects the matrix against weather elements, and in the case of a PET matrix—additionally against excessive absorbency.

The invention claimed is:

1. A method of manufacture of geotechnical profiles, wherein thermoplastic material including one or more of polyvinyl chloride (PVC), polyethylene terephthalate (PET), polyethylene or polythene (PE), acrylonitrile butadiene styrene (ABS), and polypropylene (PP), is plasticized in an extruder, pressed through a cross die unit, and internal reinforcing profiles in the form of flat bars, arched elements, angled elements, ribbed profiles or sections of any geometry are entered at least in selected cross-section areas of the geotechnical profile wherein the internal reinforcing profiles are created from one or more of continuous and chopped fiber produced simultaneously or as part of a separate production process, wherein the internal reinforcing profiles are entirely surrounded with a thermoplastic matrix comprising one or more of a non-reinforced thermoplastic matrix or a thermoplastic matrix reinforced with dispersed reinforcement, and wherein the minimum thickness of the thermoplastic matrix is 0.1 mm.

2. The method according to claim 1, comprising producing the internal reinforcing profiles by one or more of:
  calendering continuous fiber beams, mats and fabrics coated with impregnate compatible with a polymer matrix surrounding the internal reinforcing profiles; and
  calibrating continuous fibers, mats and fabrics made of hybrid fibers comprising the thermoplastic material.

3. The method according to claim 1, comprising producing the internal reinforcing profiles by calendering continuous fiber beams, mats and fabrics coated with an impregnate comprising one or more of plastisol or hydrogel.

4. The method according to claim 1, comprising producing the internal reinforcing profiles by one or more of:
  calendering continuous fiber beams, mats and fabrics coated with impregnate compatible with the thermoplastic material at temperatures allowing for thermal fusion of the impregnate; and
  calibrating continuous fibers, mats and fabrics made of hybrid fibers comprising the thermoplastic material at temperatures allowing for thermal fusion of the hybrid fibers.

5. The method according to claim 4, comprising producing temperatures allowing for thermal fusion using elements generating pressure in the form of heated slide elements—calibrators, or with the use of horizontal and vertical, single-roller, two-roller or multi-roller calendering units.

6. The method according to claim 4, comprising producing temperatures allowing for thermal fusion using heated calenders at 50-350° C.

7. The method according to claim 1, wherein the one or more of continuous and chopped fiber comprise one or more of: glass, basalt, aramid, polyamide, steel or natural, plant and animal fibers.

8. The method according to claim 1, wherein the one or more of continuous or chopped fiber are produced applying a pultrusion method, coating continuous fibers with a plastic selected from among PVC, PET, PE, ABS, or PP.

9. A reinforced geotechnical profile, manufactured out of thermoplastic material, in which reinforcement fibers in the form of internal reinforcing profiles are entered at least in selected cross-section areas, and then stabilized and maintained in position by a layer or coat made of one or more of polyvinyl chloride (PVC), polyethylene terephthalate (PET), polyethylene or polythene (PE), acrylonitrile butadiene styrene (ABS), and polypropylene (PP), which is permanently and inseparably connected to the reinforcement fibers, wherein the internal reinforcing profiles comprise one or more of ribbed profiles, arched profiles, angled elements, and sections of any geometry in one or more of a single or two-layer arrangement, or flat bars in a two-layer arrangement, wherein the reinforced geotechnical profile comprises the reinforcement fibers and thermoplastic hybrid fibers in an amount constituting 12-16% of the weight of the geotechnical profile and wherein the reinforcement fibers constitute 70% of the weight of the internal reinforcing profiles.

10. The geotechnical profile according to claim 9, wherein the thermoplastic material is selected from among one or more of: hard and high-impact PVC, PET, PE, ABS, and PP.

11. The geotechnical profile according to claim 9, wherein the reinforcement fibers comprise dispersed reinforcement made of chopped fiber.

12. The geotechnical profile according to claim 9, wherein the internal reinforcing profiles contain:
from 30-90% of the weight of the reinforcement fibers and an impregnate compatible with the layer or coat; or
thermoplastic hybrid fibers in a quantity constituting 10-70% of the overall weight of the reinforcing profile.

13. The geotechnical profile according to claim 9, wherein the thermoplastic hybrid fibers comprise glass fiber hybrid fibers and fibers of thermoplastic PET, PE, PVC or PP.

14. The geotechnical profile according to claim 9, wherein the reinforcement fibers are selected from among: glass, basalt, aramid, polyamide, steel or natural, plant and animal fibers.

15. The geotechnical profile according to claim 9, wherein the percentage amount of reinforcement fibers is 5-60%.

16. The geotechnical profile according to claim 9, wherein the percentage amount of reinforcement fibers is 12-16% in relation to the overall weight of the geotechnical profile.

17. The geotechnical profile according to claim 9, wherein the internal reinforcing profiles are placed inside walls of the geotechnical profile situated farthest from a bending axis of the geotechnical profile.

18. The geotechnical profile according to claim 9, wherein the internal reinforcing profiles are installed in one, two or multiple layers and are completely surrounded with the layer or coat.

19. The geotechnical profile according to claim 9, wherein the one or more of ribbed profiles, arched profiles, angled elements, and flat bars have varying lengths.

20. The geotechnical profile according to claim 9, wherein the internal reinforcing profiles are continuous.

21. The geotechnical profile according to claim 9, wherein the minimum thickness of the layer or coat is 0.1 mm.

22. The geotechnical profile according to claim 9, wherein all external surfaces of the geotechnical are coated with a layer of thermoplastic material of at least 0.5 mm in total thickness.

23. The geotechnical profile according to claim 9, wherein a coarseness (tex) of the reinforcement fibers is within 600-5000 tex.

24. The geotechnical profile according to claim 9, wherein a coarseness (tex) of the reinforcement fibers is within 1 000-3 000 tex.

25. The geotechnical profile according to claim 9, wherein a thickness of the internal reinforcing profiles is 0.5-6 mm.

26. The geotechnical profile according to claim 9, wherein a thickness of the internal reinforcing profiles is 1.5-2.5 mm.

27. The geotechnical profile according to claim 9, wherein a width of the internal reinforcing profiles is 5-100 mm, where individual profiles differ in width.

28. The geotechnical profile according to claim 9, wherein a width of the internal reinforcing profiles is 10-50 mm, where individual profiles differ in width.

29. The geotechnical profile according to claim 9, comprising sheet piling profiles with:
a primary shape of the letter Z, S, U, Π, T, Ω, or
hollow profile; and
wherein the sheet piling profiles contain at least one lock.

30. The geotechnical profile according to claim 29, wherein the sheet piling profiles include two locks with mutually complementary shapes.

31. A mobile flood prevention dam comprising at least two geotechnical profiles of claim 9, the at least two geotechnical profiles comprising external reinforcing profiles, including a single- or multi-chamber, hollow flood prevention dam wall and a load-bearing profile pillar having a double T-section for founding the mobile flood prevention dam in soil and providing water-tight installation of the mobile flood prevention dam.

32. The mobile flood prevention dam according to claim 31, wherein external surfaces of the at least two geotechnical profiles include seals applied using a co-extrusion method or any other method, providing water-tightness of the at least two geotechnical profiles.

* * * * *